(12) United States Patent
StClair et al.

(10) Patent No.: US 8,949,770 B2
(45) Date of Patent: Feb. 3, 2015

(54) AUTOMATED MANAGEMENT OF SOFTWARE REQUIREMENTS VERIFICATION

(75) Inventors: William Gryffyth StClair, Cupertino, CA (US); Sumner Augustine StClair, Cupertino, CA (US)

(73) Assignee: LDRA Technology, Inc., Atlanta, GA (US)

(*) Notice: Subject to any disclaimer, the term of this patent is extended or adjusted under 35 U.S.C. 154(b) by 989 days.

(21) Appl. No.: 12/078,695

(22) Filed: Apr. 3, 2008

(65) Prior Publication Data

US 2008/0263505 A1 Oct. 23, 2008

Related U.S. Application Data

(60) Provisional application No. 60/907,474, filed on Apr. 3, 2007.

(51) Int. Cl.
*G06F 9/44* (2006.01)

(52) U.S. Cl.
CPC .................................. *G06F 8/10* (2013.01)
USPC ............ 717/101; 717/106; 717/126; 717/120

(58) Field of Classification Search
USPC .................................. 717/101, 106, 120, 126
See application file for complete search history.

(56) References Cited

U.S. PATENT DOCUMENTS

| | | | |
|---|---|---|---|
| 5,892,947 A * | 4/1999 | DeLong et al. | 717/100 |
| 6,226,784 B1 | 5/2001 | Holmes et al. | |
| 7,490,319 B2 * | 2/2009 | Blackwell et al. | 717/124 |
| 7,810,070 B2 * | 10/2010 | Nasuti et al. | 717/124 |
| 7,853,882 B2 * | 12/2010 | Cheng et al. | 715/741 |
| 8,015,509 B2 * | 9/2011 | Karstens | 715/866 |
| 2002/0029377 A1 * | 3/2002 | Pavela | 717/124 |
| 2002/0154153 A1 * | 10/2002 | Messinger et al. | 345/705 |
| 2004/0123272 A1 | 6/2004 | Bailey et al. | |
| 2004/0230964 A1 | 11/2004 | Waugh et al. | |
| 2005/0066285 A1 * | 3/2005 | Santori et al. | 715/763 |
| 2005/0166094 A1 * | 7/2005 | Blackwell et al. | 714/38 |
| 2005/0183025 A1 * | 8/2005 | Kumar | 715/764 |

(Continued)

OTHER PUBLICATIONS

Using Rational RequisitePro® Version 2000.02.10, 2000.*

(Continued)

*Primary Examiner* — Li B Zhen
*Assistant Examiner* — Viva Miller
(74) *Attorney, Agent, or Firm* — Buchanan Ingersoll & Rooney PC

(57) ABSTRACT

An exemplary system for electronically managing requirements for software development includes a projects module, a requirements module, a mapping module and a verification module. The projects module is configured to establish a software development project. The requirements module is configured to define requirements for the project based on requirements information captured from a requirements source. For each requirement, the projects module is configured to associate source code developed for the requirement with the project or assign the requirement for development of source code. The mapping module is configured to map procedures identified in the source code to the defined requirements. The verification module is configured to verify the defined requirements based on results of one or more of analysis, code coverage measurements and unit testing performed on the mapped procedures.

74 Claims, 26 Drawing Sheets

(56) References Cited

U.S. PATENT DOCUMENTS

| | | | |
|---|---|---|---|
| 2006/0048093 A1* | 3/2006 | Jain et al. | 717/104 |
| 2006/0253802 A1* | 11/2006 | Kim | 715/836 |
| 2007/0038977 A1* | 2/2007 | Savage | 717/106 |
| 2008/0098349 A1* | 4/2008 | Lin et al. | 717/106 |
| 2008/0134152 A1* | 6/2008 | Edde et al. | 717/135 |

OTHER PUBLICATIONS

International Search Report and Written Opinion issued in PCT/US2008/004349, mailed on Aug. 7, 2008, 8 pages.

Office Action from European Patent Office dated Aug. 8, 2012, issued in corresponding European Patent Application No. 08 742 527.8.

Office Action from Chinese Patent Office dated Nov. 5, 2012, issued in corresponding Chinese Patent Application No. 200880017725.4, with English translation thereof.

Office Action from Israeli Patent Office dated Dec. 4, 2013, issued in corresponding Israeli Patent Application No. 201368, with English translation thereof.

Product description of Reqtify from Geensys. On the web at geensys.com./?Outils/Reqtify. Printed Aug. 7, 2008, 3 pages.

Product description of Coverity Prevent and Coverity Extend from Coverity. Description of Coverity Prevent: on the web at coverity.com/library/pdf/coverity_prevent.pdf. Printed Aug. 7, 2008, 4 pages. Description of Coverity Extend: on the web at coverity.com/library/pdf/coverity_extend.pdf. Printed Aug. 7, 2008, 2 pages.

Product description of QA-C, QA-C++ and QA-MISRA from Programming Research. Overview of QA-C: on the web at pr-qa.com/programmingresearch/QAC_MAIN.html#1 3. Printed Aug. 7, 2008, 1 page. Overview of QA-C++: on the web at pr-qa.com/programmingresearch/QACPP_MAIN.html#1_3. Printed Aug. 7, 2008, 1 page. Snapshot of QA-MISRA: on the web at pr-qa.com/programmingresearch/QAMISRA.html. Printed Aug. 7, 2008, 1 page.

Product description of PC-lint for C/C++ and other Lint based products from Gimpel Software. On the web at gimpel.com. Printed Jul. 24, 2008, 2 pages.

Product description of inSpect, inSight, inTellect and inForce from Klocwork. Technical brief of inSpect: on the web at klocwork.de/inSpect_IPL.pdf. Printed Aug. 7, 2008, 2 pages. Technical brief of inSight: on the web at klocwork.de/inSight_IPL.pdf. Printed Aug. 7, 2008, 2 pages. Technical brief of inTellect: on the web at klocwork.de/inTellect_IPL.pdf. Printed Aug. 7, 2008, 2 pages. Technical brief of inForce: on the web at klocwork.de/inForce_IPL.pdf. Printed Aug. 7, 2008, 2 pages.

Product description of C++Test, C++ Test for Embedded Systems from Parasoft. On the web at parasoft.com/jsp/products/home.jsp?product=CppTest&itemId=47. Printed Jul. 24, 2008, 4 pages.

Product description of Jtest with Test Case Sniffer, Codewizard from Parasoft. Description of Jtest with Test Case Sniffer: on the web at parasoft.com/jsp/products/release.jsp?arcticleId=1957&product=Jtest. Printed Jul. 24, 2008, 2 pages. Description of Codewizard: on the web at h21007.www2.hp.com/portal/site/dspp/menuitem.863c3e4cbcdc3f3515b49c108973a801?ciid=01080055abe021100055abe02110275d6e10RCRD. Printed Aug. 7, 2008, 2 pages.

Product description of McCabe IQ from McCabe Software. On the web at mccabe.com/iq.htm. Printed Aug. 7, 5 pages, Aug. 7, 2008.

Product description of Telelogic Logiscope from Telelogic. On the web at telelogic.com/products/logiscope/index.cfm. Printed Jul. 24, 2008, 2 pages.

Product description of and Telelogic TAU/Tester from Telelogic. On the web at telelogic.com/products/tester/overview.cfm. Printed Jul. 24, 2008, 2 pages.

Product description of Telelogic TAU/Logiscope Test Checker in "Telelotgic's TAU/Logiscope puts QA in Developers' hands," by John K. Waters in Application Development Trends, Jul. 21, 2004. On the web at javareport.com/article.aspx?id=9766. Printed Jul. 25, 2008, 5 pages.

Product description of CMT++, Complexity Measures for C/C++ from Testwell. On the web at testwell.fi/cmtdesc.html. Printed Aug. 7, 2008, 8 pages.

Product description of Vector/CAST/Ada, Vector/CAST/C, Vector/CAST RSP for Real-time Embedded Testing and Vector/CAST/Cover from Vector Software. Description of Vector/CAST/Ada: on the web at vectorcast.com/vcproducts/vectorcastada.php. Printed on Aug. 7, 2008, 2 pages. Description of Vector/CAST/C: on the web at vectorcast.com/vcproducts/vectorcastc.php. Printed on Aug. 7, 2008, 2 pages. Description of Vector/CAST RSP for Real-time Embedded Testing: on the web at vectorcast.com/vcproducts/vectorcastrsp.php. Printed on Aug. 7, 2008, 4 pages. Description of Vector/CAST/Cover: on the web at vectorcast.com/vcproducts/vectorcastcover.php. Printed on Aug. 7, 2008, 4 pages.

Overview of Rational Test RealTime from IBM. On the web at 306.ibm.com/software/rational. Printed Aug. 7, 2008, 1 page.

Product description of Adatest 95 and Cantata++ from IPL. Description of Adatest 95: on the web at iplbath.com/products/tools/pt600.uk.php. Printed on Aug. 7, 2008, 4 pages. Technical brief of Cantata++: on the web at iplbath.com/pdf/p0003.uk.pdf. Printed on Aug. 7, 2008, 2 pages.

Product description of Cunit. http://sourceforge.net/projects/cunit. Printed on Jul. 25, 2008, 2 pages.

Product description of CPPunit. http://sourceforge.net/projects/jcppunit. Printed on Jul. 25, 2008, 2 pages.

Product description of Junit. http://sourceforge.net/projects/junit. Printed on Jul. 25, 2008, 2 pages.

Office Action from the Israel Patent Office dated Apr. 23, 2014, issued in corresponding Israeli Patent Application No. 201368, with English translation thereof. (5 pages).

* cited by examiner

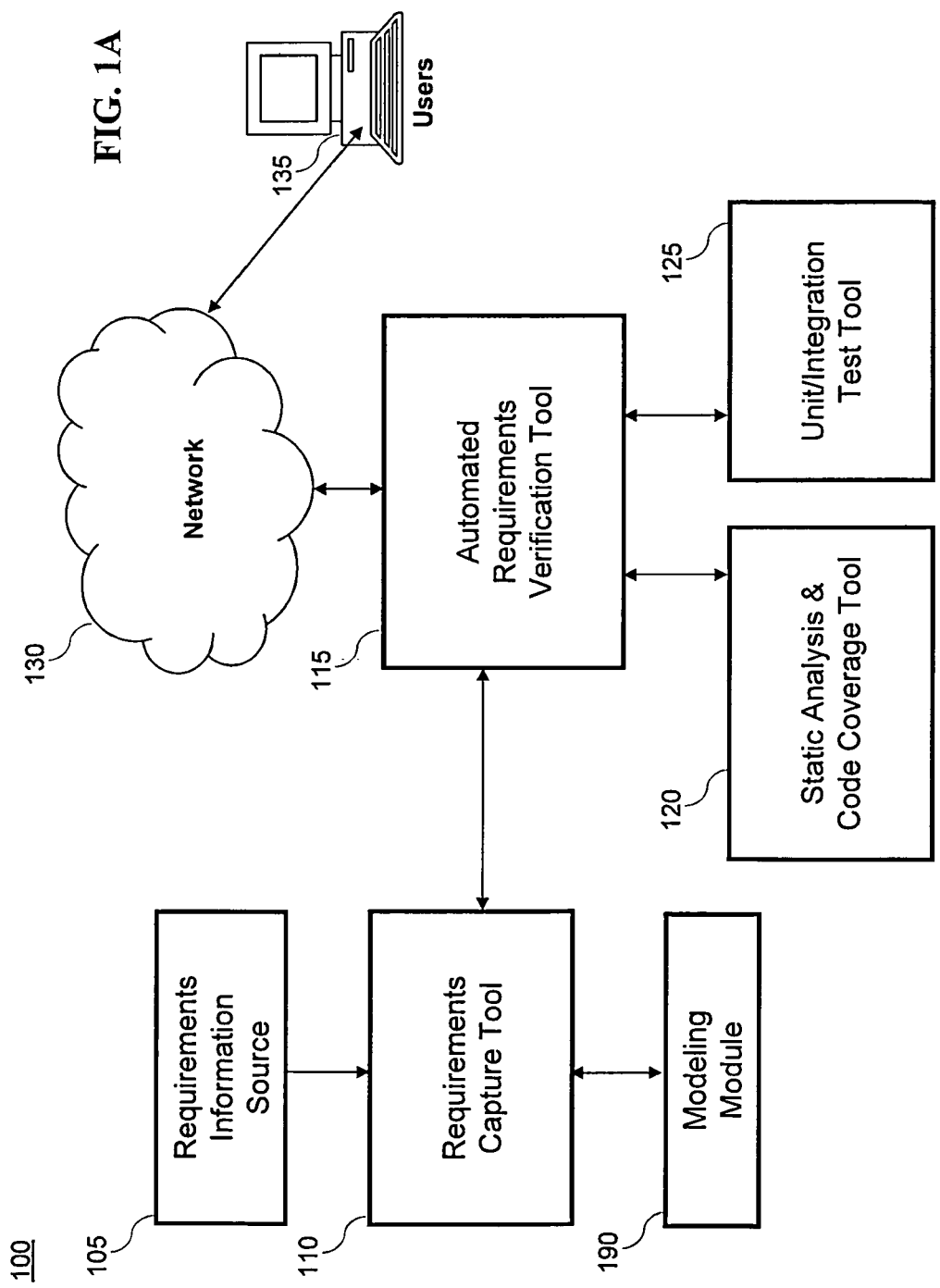

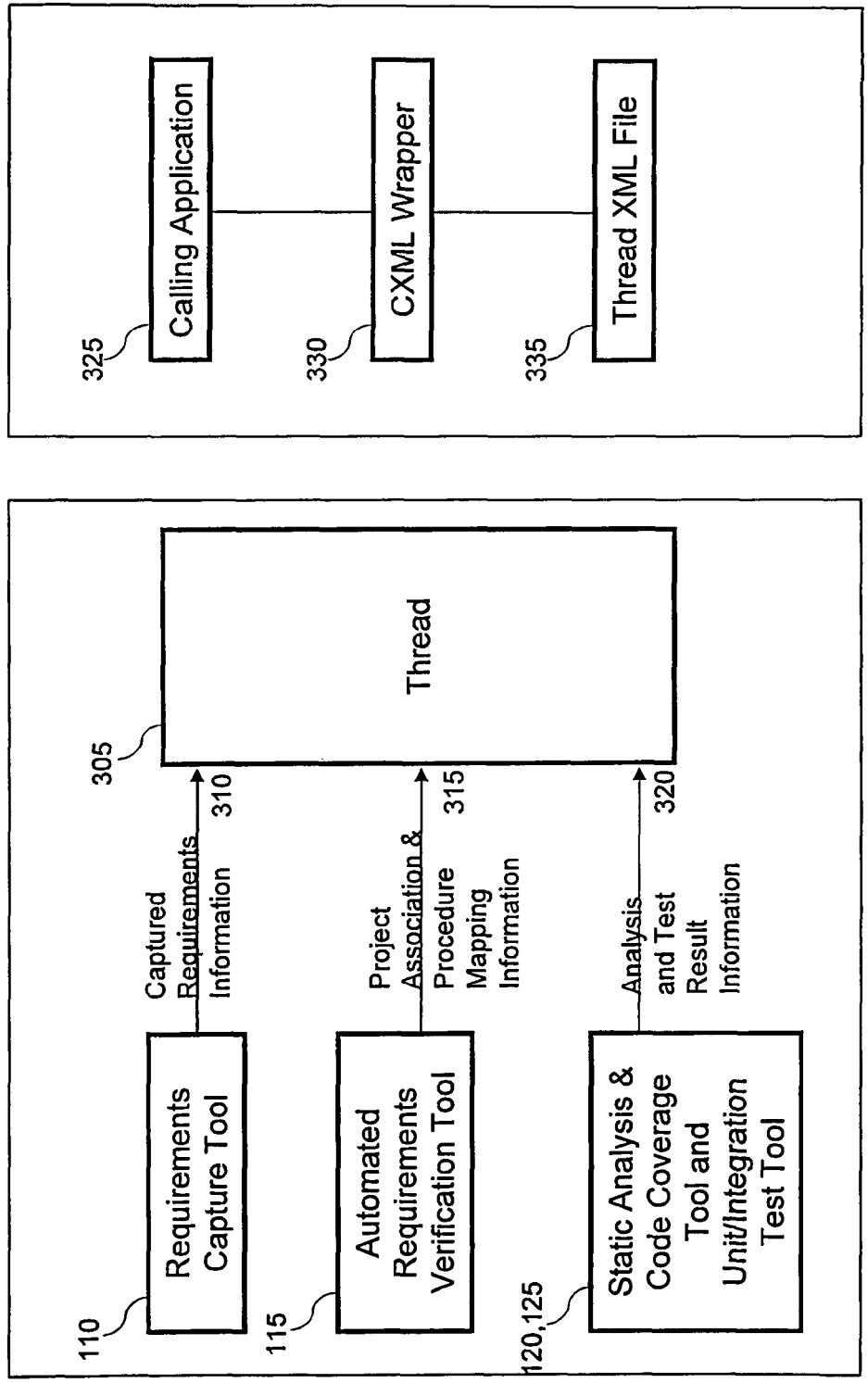

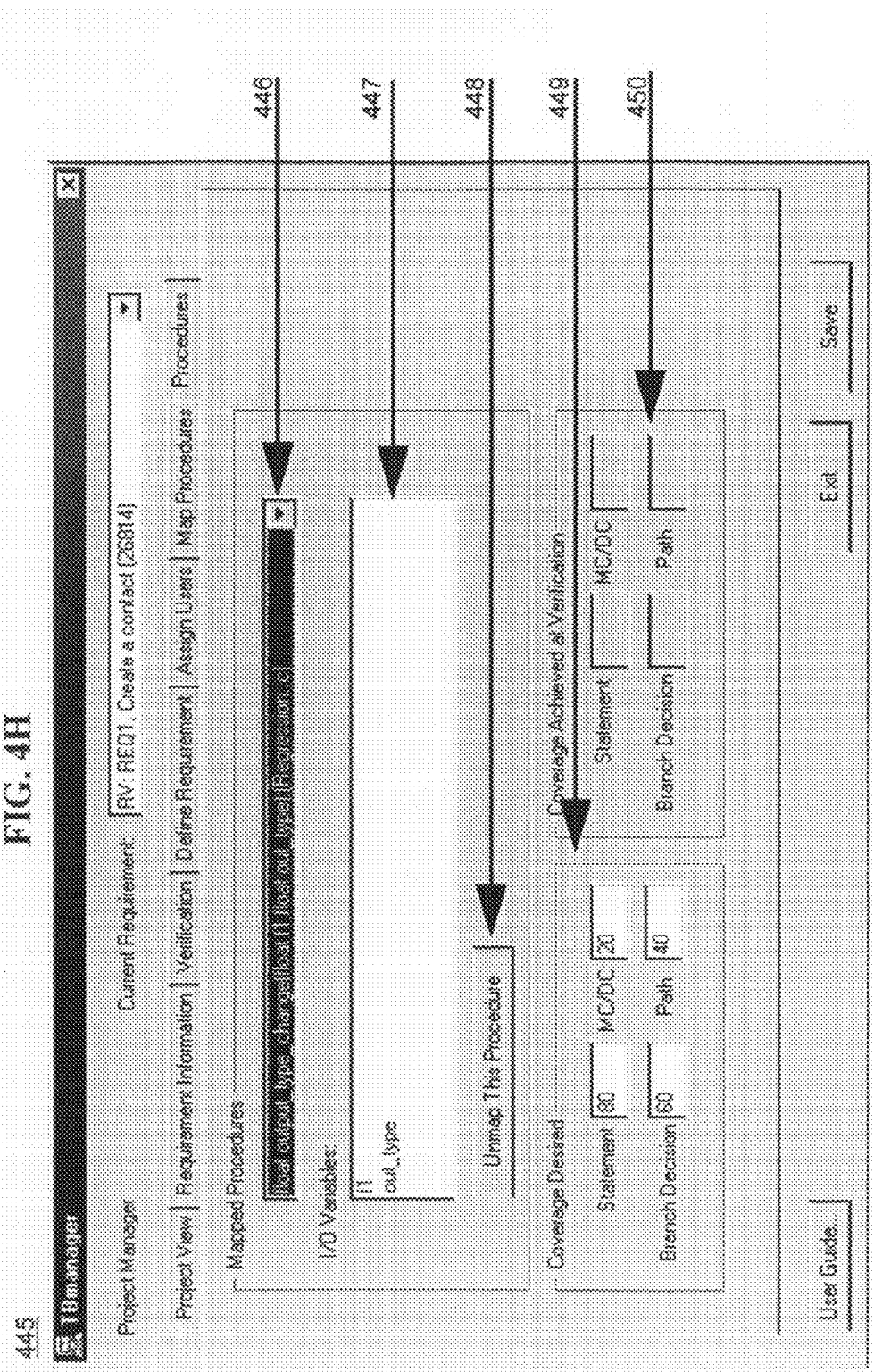

AUTOMATED MANAGEMENT OF SOFTWARE REQUIREMENTS VERIFICATION

FIELD OF THE INVENTION

The present invention relates to management of software development requirements. More particularly, the present invention relates to automated techniques and tools for integration of distributed requirements traceability and software testing/verification.

BACKGROUND

In many safety-critical and mission-critical industries, such as the avionics, medical, defense, and nuclear industries, among others, requirements traceability and verification tasks associated with software development projects can consume a significant portion of the project budget. Techniques exist for automatically capturing requirements information for software development projects from various sources of requirements information into the form of a requirements traceability matrix (RTM), which can be used to trace the implementation of the requirements in source code. The RTM typically includes project-level, customer-defined requirements that specify how the software product should operate as well as low-level design constraints, but not code-level, verification requirements that specify how the software product should be verified. Further, techniques exist for manually testing source code written to implement the requirements and for verifying the requirements. What is needed, therefore, is a technique for integrating and automating the requirements traceability and testing/verification tasks of a distributed software development project, including a uniform user interface to help manage highly complex and technical software development projects.

SUMMARY

The present invention supports highly distributed and asynchronous operations. Exemplary embodiments of the present invention, which utilize a central depository, are inherently centralized and can be managed by administrators. Exemplary embodiments of the present invention link user workspaces and development artifacts in a dynamically managed project tree, thereby synthesizing the processes and ensuring their repeatability. The users return the software development artifacts to central repository. Thus, exemplary embodiments of the present invention establish and maintain demonstrable traceability. Accordingly, exemplary embodiments of the present invention can solve the problems with related art systems, in which the processes performed are consequently largely manual, error prone and inconsistent. Please note that the present invention is not limited to or required to solve the problems in related art.

An exemplary method for electronically managing requirements for software development includes: establishing a software development project; defining requirements for the project based on requirements information captured from a requirements source; for each requirement, associating source code developed for the requirement with the project or assigning the requirement for development of source code; mapping procedures identified in the source code to the defined requirements for the project; and verifying the defined requirements for the project based on results of one or more of analyses, code coverage measurements and unit testing performed on the mapped procedures.

An exemplary method for electronically managing requirements for software development using extensible markup language (XML) includes creating an XML thread for each of a plurality of requirements defined for a software development project. Each thread comprises a plurality of elements that describe properties of the thread and a unique identifier that enables traceability of the defined requirements for the project. The method also includes implementing XML wrappers to enable applications to interface with the XML threads. The properties of each XML thread include a corresponding defined requirement for the project, procedures of source code for the project that are mapped to the corresponding defined requirement, and results of one or more of analyses, code coverage measurements and unit testing performed on the mapped procedures.

An exemplary system for electronically managing requirements for software development across a network of users includes a projects module, a requirements module, a mapping module and a verification module. The projects module is configured to establish a software development project. The requirements module is configured to define requirements for the project based on requirements information captured from a requirements source. For each requirement, the projects module is configured to associate source code developed for the requirement with the project or assign the requirement for development of source code. The mapping module is configured to map procedures identified in the source code to the defined requirements. The verification module is configured to verify the defined requirements based on results of one or more of analyses, code coverage measurements and unit testing performed on the mapped procedures.

An exemplary system for electronically managing requirements for software development across a network of users includes a project module configured to establish a software development project; a requirement module configured to define requirements for the project based on requirements information captured from a requirements source; a modeling module configured to include architectural artifacts and implementation artifacts; and a verification module configured to verify the defined requirements for the project based on results of one or more of tests in accordance to one or more verification rules. The module links the defined requirements to architectural artifacts and implementation artifacts of the modeling module.

An exemplary method for electronically managing requirements for software development includes establishing a software development project; defining requirements for the project based on requirements information captured from a requirements source; establishing a modeling module that includes architectural artifacts and implementation artifacts; and verifying the defined requirements for the project based on results of one or more of tests in accordance to one or more verification rules. The defined requirements are linked to respective architectural artifacts and implementation artifacts.

BRIEF DESCRIPTION OF THE DRAWINGS

Other objects and advantages of the invention will become apparent to those skilled in the relevant art(s) upon reading the following detailed description of preferred embodiments, in conjunction with the accompanying drawings, in which like reference numerals have been used to designate like elements, and in which:

FIGS. 1A and 1B illustrate an exemplary environment in which a system for automatically managing software requirements verification can be implemented and an exemplary embodiment of an automated requirements verification tool, respectively;

FIGS. 3A-3E illustrate an exemplary extensible markup language (XML) implementation of a system for automatically managing software requirements verification;

FIGS. 4A-4J illustrate screen captures of an exemplary graphical user interface of a system for automatically managing software requirements verification.

DETAILED DESCRIPTION

System Overview

Figure 1B:
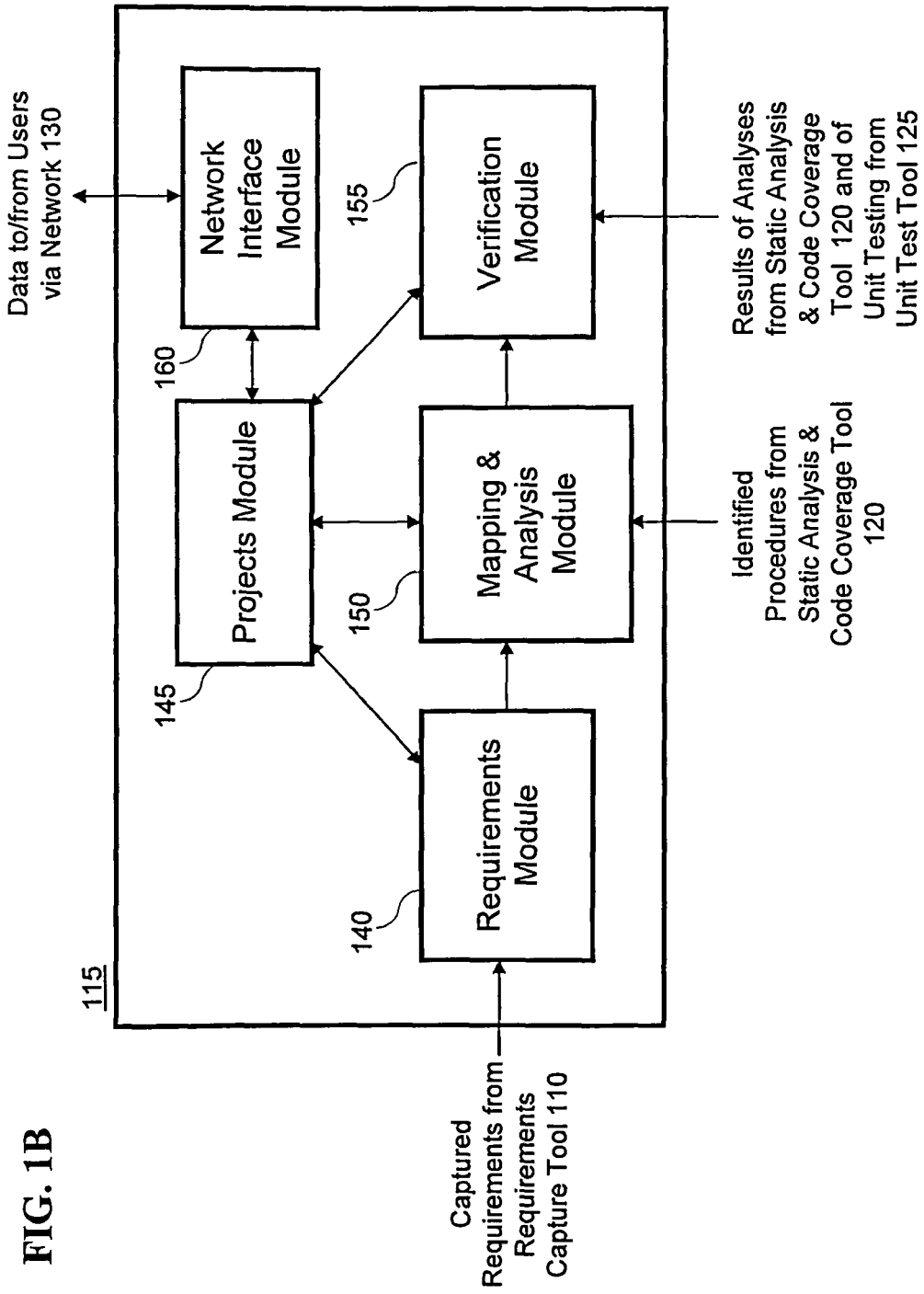

The present invention shall be described by way of exemplary embodiments to which it is not necessary limited. Variations and modifications will occur to these skilled in the art without departing from the scope of invention defined in the claims appended hereto. Absolute statements (that begin with, e.g., "must"), and statements of advantages or other aspects apply to specific exemplary embodiments, and not necessarily to all embodiments covered by the claims.

Techniques for automated management of software requirements are presented herein that can bridge the gap between high-level requirements traceability tools and low-level source code testing tools across a network of distributed user workspace (e.g. work directories enabled by instances of the invention). The explanation will be by way of exemplary embodiments to which the present invention is not limited.

FIG. 1A illustrates an exemplary environment for implementing a system 100 for automated management of software requirements verification. As shown in FIG. 1A, the system 100 can be employed in conjunction with a computer-based system, where the elements can be implemented in hardware, software, firmware, or combinations thereof. As shown in FIG. 1A, system 100 includes a requirements information source 105, a requirements capture tool 110, an automated requirements verification tool 115, a static analysis & code coverage tool 120, a unit/integration test tool 125, a network 130, and users 135. Software development projects (e.g., a billing system for a hospital, an inventory tracking system for a store, an avionics display system, etc.) can be defined by requirements. The requirements can specify how the software product should operate when it is implemented. The requirements information source 105, shown in FIG. 1A, can represent any source of requirements information, including requirement management tools, e.g., Telelogic DOORS®, and IBM Rational RequisitePro®, spread sheet programs, e.g., Microsoft Excel®, word processing programs, e.g., MS Word®, among other sources of requirements information. The requirements capture tool 110, can be implemented to capture the requirements information from the requirements information source 105. This information may include requirement identifier and requirement description as well as test case identifier and test case description.

In one embodiment, the requirements capture tool 110 can use natural language parsing to parse the requirements information. For example, a requirement capture tool, such as the Reqtify™ tool from Geensys (on the web at geensvs.com) employs such techniques to generate a RTM from requirements information. Products, such as LDRA TBreq™, or customized hand-coded systems can be employed to implement the requirements capture tool 110. The parsing of requirements can be performed based on types, as described in more detail below in the subsection entitled "Parsing Based On Types View."

For example, if software is to be developed for an on-line grocery store, the requirements information source might include an MS Word™ document that specifies, among other requirements, "the on-line grocery store shall maintain a customer account." In this example, the requirements capture tool 110 might capture from the text of the MS Word™ document, the requirement information "maintain account." In another example, the requirements information source might include a DOORS™ module that specifies, among other requirements, "the software must provide fault isolation for all fault types." In this example, the requirements capture tool 110 might capture from the text of the DOORS™ module, the requirement information "Isolate faults."

In an exemplary embodiment, a software modeling module 190 can be used with the requirement capture tool 110. The software modeling module 190 can be implemented by a software modeling tool, such as Telelogic Rhapsody™, Mathworks Simulink™ or National Instruments Labview™. In this exemplary embodiment, the requirements capture tool 110 links requirements to architectural artifacts and implementation artifacts in the software modeling tool 190. These architectural and implementation artifacts are thereby implicitly mapped to the resulting source code that is produced by the modeling tool. Thus, each requirement is associated with one or more software architectural model elements. The model elements are propagated to the distributed verification modules for the purposes of implementation, testing and analysis.

In addition, a modeling tool or a software architectural model can be used to automatically generate source code in which the mapping between requirement and source code is made. In other words, the requirements linked with the architectural and implementation artifacts are implicitly mapped to resulting source code produced by the modeling tool.

If the software implementation is manually coded, the mapping of requirements to source code is performed using automated requirements verification tool 115 based on the implementation artifacts produced by the modeling tool. The automated requirements verification tool 115 will be described below in detail.

The static analysis & code coverage tool 120 can be implemented to analyze source code files, which have been written by software developers, to identify procedures in the source code and to assess compliance of the source code with project coding rules and quality metrics. As referred to herein, a "procedure" describes a portion of source code written to implement a requirement. For example, procedures might include functions in the C programming language and classes and member functions in the C++ programming language. Automated software analysis and testing products, such as LDRA Testbed™; Coverity's (on the web at coverity.com) Coverity Prevent Coverity Extend; Programming Research's (on the web at programmingresearch.com) QA-C, QA-C++ and QA-MISRA; Gimple Software's (on the web at gimpel-.com) PC-lint for C/C++ and another Lint based products; Klocwork's (on the web at klocwork.com) inSpect, inSight, inTellect and inForce; Parasoft's (on the web at parasoft.com) C++ Test, C++ Test for Embedded Systems, Code Wizard with Test Case Sniffer; McCabe & Associates' (on the web at mccabe.com) McCabe IQ; Telelogic's Telelogic Logiscope, TAU/Tester and TAU/Logiscope TestChecker; and Testwell's (on the web at testwell.fi) CMT++, Complexity Measures Tool for C/C++ can be employed to implement the static analysis capabilities of the static analysis & code coverage tool 120.

For the on-line grocery store example, an exemplary source code file "MaintainAccount.c" for implementing the captured requirement "maintain account" might include the following lines of code:

```
float MaintainAccountFunction( )
{
    long accntNum;
    float balance, avgBalance, ratio;
    accntNum = GetSessionAccountNumber( );
    if (accntNum == 0) { return –1; }
    balance = GetAccountBalance(accntNum);
    if (balance <= 0) { FatalError("Balance too low"); }
    avgBalance = GetAverageAccountBalance(accntNum);
    ratio = balance / avgBalance;
    if (ratio < .2)
    {
        UserMessage("Balance is running low");
    }
    return 0;
}
```

In this example, the static analysis & code coverage tool 120 might identify the following basic blocks of source code (blocks 4-6):

```
60    4    balance =
61    4        GetAccountBalance (
62    4        accntNum ) ;
63    4    if
64    4        (
65    4        balance <= 0
66    4        )
-----------------------------------------------
67    5    {
68    5
69    5        FatalError (
70    5        "Balance too low" ) ;
71    5    }
-----------------------------------------------
72    6    avgBalance =
73    6        GetAverageAccountBalance (
74    6        accntNum ) ;
75    6    ratio = balance / avgBalance ;
76    6    if
77    6        (
78    6        ratio < .2
79    6        )
```

After analyzing the source code for compliance with project coding rules, the static analysis & code coverage tool 120 might identify the following code for non-compliance (M) Mandatory:

```
-----------------------------------------------
56    2    {
57    2        return
58    2        – 1 ;
(M) STATIC VIOLATION: 101 S : Function return type inconsistent
-----------------------------------------------
67    5    {
68    5
69    5        FatalError (
70    5        "Balance too low" ) ;
```

-continued

```
(M) VIOLATION    :    1 J : Unreachable Code found.
71    5    }
-----------------------------------------------
72    6    avgBalance =
73    6        GetAverageAccountBalance (
74    6        accntNum ) ;
75    6    ratio = balance / avgBalance ;
76    6    if
77    6        (
78    6        ratio < .2
(M) STATIC VIOLATION        : 96 S : Use of mixed mode arithmetic:
float   double        ratio < .2
79    6        )
```

For the avionics display system example, an exemplary source code file "CheckAvionicsDisplay.c" for implementing the captured requirement "maintain account" might include the following lines of code:

```
int CheckAvionicsDisplay( )

{
    // attempt to start modules. If a module AND its backup fail,
    // return a negative number indicating the failed module.
    //
    if (!BITestModule1( )) { if (!BackupModule1( )) return –1; }
    if (!BITestModule2( )) { if (!BackupModule2( )) return –2; }
    if (!BITestModule3( )) { if (!BackupModule3( )) return –3; }
    // everything started up. Return 1 to indicate success.
    return 1;
}
```

In this example, the static analysis & code coverage tool 120 might identify the following basic blocks of source code (blocks 1-7):

```
37    1    int
38    1        CheckAvionicsDisplay( )
39    1    {
40    1    //attempt to start modules. If a module & its backup fail
41    1    // return a negative number indicating the failed module.
42    1
43    1        if
44    1        (
45    1        !
46    1        BITestModule1 ( )
47    1        )
-----------------------------------------------
48    2    {
49    2        if
50    2        (
51    2        !
52    2        BackupModule1 ( )
53    2        )
-----------------------------------------------
54    3    {
55    3        return
56    3        –1 ;
-----------------------------------------------
--
57    4    }
-----------------------------------------------
--
58    5    }
-----------------------------------------------
--
59    6    if
60    6    (
61    6    !
62    6        BITestModule2 ( )
63    6    )
-----------------------------------------------
--
64    7    {
```

-continued

```
65    7              if
66    7                (
67    7                  !
68    7                    BackupModule2 ( )
69    7                )
```

After analyzing the source code for compliance with project coding rules, the static analysis & code coverage tool 120 might identify the following code for non-compliance (M) Mandatory:

```
37    1    int
38    1        CheckAvionicsDisplay( )
(M) STATIC VIOLATION: 63 S Empty parameter list to procedure/
funct.
39    1    {
40    1    // attempt to start modules. If a module & its backup fail,
41    1    // return a negative number indicating the failed module.
42    1    //
43    1        if
44    1          (
45    1            !
46    1              BITestModule1 ( )
(M) STATIC VIOLATION      : 114 S : Expression is not Boolean.
47    1          )
-----------------------------------------------------------------
48    2        {
49    2          if
50    2            (
51    2              !
52    2                BackupModule1 ( )
(M) STATIC VIOLATION        : 114 S : Expression is not Boolean.
53    2            )
-----------------------------------------------------------------
54    3        {
(M) STATIC VIOLATION : No brackets to then/else (added by analysis).
55    3          return
56    3            − 1 ;
-----------------------------------------------------------------
57    4        }
-----------------------------------------------------------------
58    5    }
-----------------------------------------------------------------
59    6        if
60    6          (
61    6            !
62    6              BITestModule2 ( )
(M) STATIC VIOLATION      : 114 S : Expression is not Boolean.
63    6          )
67    7            !
68    7              BackupModule2 ( )
(M) STATIC VIOLATION        : 114 S : MISRA-C:2004 12.6 13.2:
Expression is not Boolean.
69    7          )
-----------------------------------------------------------------
```

Moreover, the static analysis & code coverage tool 120 can be reapplied to instrument and measure code coverage in tests run externally. The integration of the static analysis and code coverage (also referred to as dynamic analysis) capabilities of the static analysis & code coverage tool 120 provides the critical basis for the triangulation of test verification and the structural coverage of software abstractions.

The unit/integration test tool 125 can be implemented to test the source code against the requirements. In an embodiment, the unit/integration test tool 125 can run test cases defining inputs to portions of the source code and expected outputs, and generate results that describe code coverage. For example, the source code can be implemented as a plurality of functions. If a particular function is called and executed during unit/integration testing, then the function can be described as being "covered." Thus, it is typically desirable to have a high percentage of the source code covered. Also, different levels of coverage can be tested during unit/integration testing, such as path coverage, statement coverage, branch coverage, and modified condition/decision coverage (MC/DC). Automation and integration testing software products, such as LDRA TBrun™; Parasoft's (on the web at parasoft.com) C++ Test, C++ Test for Embedded Systems, Code Wizard and Jest with Test Case Sniffer; Vector Software's (on the web at vectorcast.com) VectorCAST/Ada, VectorCAST/C, VectorCAST RSP for Real-time Embedded Testing and VectorCAST/Cover; IBM Rational (www-306.ibm.com/software/rational/) Test RealTime; IPL (on the web at ipl.com) Adatest 95 and Cantata++; Free Software Foundation's (on the web at gnu.org) Cunit, CPPunit and Junit; and Testwell (on the web at testwell.fi) CTA++, C++ Test Aider, CTC++, Test Coverage Analyzer for C/C++, can be employed to implement the unit/integration test tool 125.

For the on-line grocery store example, an exemplary test case might test the procedures mapped to the requirement "maintain account," such as float MaintainAccountFunction( ), against the requirement. In this example, the test case might specify that if the GetAccountBalance(accntNum) is called with an input value=3201, the test case would return a value=1. The coverage results of unit testing in this example might be represented as follows:

```
--COVERAGE--
- Statement -
Desired Coverage(%): 80
Mapped Procedures Passing(%): 89
- Branch Decision -
Desired Coverage(%): 60
Mapped Procedures Passing(%): 63
- Path -
Desired Coverage(%): 70
Mapped Procedures Passing(%): 72
```

For the avionics display system example, an exemplary test case might test the procedures mapped to the requirement "Isolate faults," such as int CheckAvionicsDisplay( ), against the requirement. In this example, the test case might specify that if the function BITestModule3( ) is set to 1 and BackupModule3( ) returns 1. The coverage results of unit testing in this example might be represented as follows:

```
--COVERAGE--
- Statement -
Desired Coverage(%): 80
Mapped Procedures Passing(%): 61
- Branch Decision -
Desired Coverage(%): 60
Mapped Procedures Passing(%): 51
- Path -
Desired Coverage(%): 50
Mapped Procedures Passing(%): 48
```

Tracing whether the captured requirements have been implemented in source code and verifying whether the implemented source code operates as desired can be performed manually, but for large software development projects having thousands of requirements, manual tracing and verification of the requirements can quickly become impractical and unmanageable. Accordingly, as shown in FIG. 1A, the automated requirements verification tool 115 can be implemented to bridge the gap between the requirements capture tool 110 and the static analysis and unit/integration test tools 120 and 125. FIG. 1B illustrates an exemplary implementation of the automated requirements verification tool 115 that includes a requirements module 140, a projects module 145, a mapping & analysis module 150, a verification module 155, and a network interface module 160. The LDRA TBmanager™ tool, described herein in conjunction with FIGS. 4A-4J, can be employed to implement the automated requirements verification tool 115.

The requirements module 140 can be configured to define requirements for the software development project based on the requirements information captured by the requirements capture tool 110 from the requirements information source 105. The captured requirements information can represent customer-defined, project-level requirements for the software development project, which are referred to herein as "high-level" requirements. In the on-line grocery store example, the captured requirement "maintain account" is an exemplary high-level requirement. High-level requirements, however, do not describe code-level, design requirements necessary for actually implementing the software. Thus, the requirements module 140 can be configured to provide the option of defining additional requirements not captured by the requirements capture tool 110.

For example, the requirements module 140 can be used to define requirements that fulfill part of a high-level requirement, referred to herein as "low-level" requirements. Low-level requirements can be defined to specify how a portion of the software should be implemented. For example, a low-level requirement might focus on a specific function, aim or goal. In the on-line grocery store example, a low-level requirement called "account_name" can be defined for the high-level requirement "maintain account" to establish a name for the account. In another example, the avionics display system, the low-level requirement, "enable named redundant system" is defined for the high-level requirement "Isolate faults" to ensure that only the redundant module identified by Built In Test is enabled.

The requirements module 140 can also be used to define requirements that are inferred or derived from high-level requirements or low-level requirements, referred to herein as "derived" requirements. Thus, derived requirements may not be captured by the requirements capture tool 110 but can be subsequently created and managed by the automated requirements verification tool 115. In the on-line grocery store example, a derived requirement called "cancel_account" can be defined for the high-level requirement "maintain account" to cancel a maintained account. In another example, the avionics display system, a derived requirement called "damage assessment" can be defined for the high-level requirement "Isolate faults" to facilitate recovery procedure notification.

The requirements module 140 can further be used to define requirements that are copies of a high-level, low-level or derived requirement, referred to herein as "sibling" requirements. A sibling requirement can be created for the purposes of requirement diversification and task management (e.g., one of the users 135 might write source code to implement a low-level requirement, while another one of the users 135 might verify the implemented source code). As described herein, a sibling requirement can be distinguished by a unique identifier, although it is otherwise identical to the base high-level, low-level, or derived requirement of which it is a copy. In this way, the requirements module 140 can be used to populate the RTM with the captured high-level requirements from the requirements information source 105, as well as with additional low-level, derived, and sibling requirements to enable the automated requirements verification tool 115 to provide automated requirements traceability down to the source code level.

A sibling requirement can be called a verification task. An additional sibling type, or verification task, is called an objective. Objectives are defined to assure conformance with process objectives or qualitative assessments such as requirement validation or proper planning and documentation.

Another sibling requirement type is associated with defect report generation and resolution. A defect report, the obverse of a requirement, can be generated automatically by the users of the static analysis & code coverage tool 120 or the unit/integration test tool 125. The assignment of defect report spawns a sibling or verification task whose sole purpose is the tracking of defect report to closure.

The projects module 145 can be configured to establish a project. As referred to herein, a "project" established by the projects module 145 describes an electronic realization of a real-world software development project in that the established project can provide an electronic mechanism for organizing and automating many aspects of the real-world project, including, among other aspects, defining the requirements for the project, assigning users to work on the project, tracing the implementation of the requirements, analyzing and verifying source code files developed to implement the requirements, and tracking defects. The established project can include associated requirements information and source code files written by developers to implement the requirements. In one embodiment, source code previously developed for a requirement can be associated with the project. If source code is not already developed for the requirement, the projects module 145 can facilitate requirements-based development in which assigning the requirement to a user is a precursor to source code development.

The projects module 145 can be configured to display a hierarchical representation of the associated requirements and source code files for the established project and can provide information on the status of a requirement (e.g., whether the requirement is verified or unverified, the users assigned to work on the requirement, etc.). For example, FIG. 4C, described herein in conjunction with an exemplary user interface, illustrates a Project Tree 412 for the on-line grocery store example showing a hierarchy of requirements and source code files. By linking high-level requirements with their low-level implementations, the projects module 145 can enable project managers to view a requirement-by-requirement breakdown of which requirements' implementations have met coding convention, code coverage levels, and functional testing criteria. In this way, the projects module 145 can provide an integrated requirements traceability and verification matrix. In an embodiment, the projects module 145 can generate a status report summarizing the requirements information for a particular user that can be updated as the project progresses to include code coverage results after unit testing, as described herein, among other information.

The projects module 145 can be configured to add the users 135 to the project. The users 135 can include any persons working on the project, such as project managers, software developers, test engineers, etc. In an embodiment, the projects module 145 can create "roles" for the project based on groups of the users 135, who are designated to perform similar actions, and to assign the created roles to the users 135. For example, a developer role, a test engineer role, an independent verification and validation (IVV) role, and a quality assurance (QA) role can be created, among others. In an embodiment, a project manager role can be created so that a user assigned the role of project manager can exercise control over virtually all aspects of the requirements verification process and can create other roles, as well as assign roles and requirements to the users 135.

In an embodiment, permissions can be assigned to the roles to define actions that users assigned to the role can perform. Exemplary permissions include, among others, a create low-level requirements permission, a create derived requirements permission, a make sub-projects permission (e.g., where a sub-project can be established when a requirement is assigned to a user, as described herein), an edit thread properties permission (e.g., where an XML thread can be created for each requirement, as described herein), and a manual verification permission (e.g., to permit a user to access the verification module 155 to review results of the unit testing, code coverage and static analysis as described herein).

The projects module 145 can also be configured to enable a user with the necessary permissions to assign requirements (i.e., the high-level, low-level, derived, and sibling requirements) defined by the requirements module 140 to the users 135. In one embodiment, assignment of a requirement to a user can establish a corresponding sub-project. A "sub-project," as referred to herein, describes a workspace that the user can access to perform designated tasks associated with their assigned role (e.g., writing source code, analyzing source code files, testing source code files, etc.).

In one embodiment, the projects module 145 can regulate the operational status of a sub-project to require that users "check-out" a sub-project from the projects module 145 before performing any tasks on the sub-project and "check-in" the sub-project to the projects module 145 upon completion of the task(s). That is, to check-out a sub-project, users can make a copy of their sub-project file for the purpose of performing tasks remotely (e.g., on their own computers) and, to check-in the sub-project, users can copy the modified contents of their sub-project file back into a directory tree for the established project. In this way, the projects module 145 can maintain integrity of the RTM by synchronizing the sub-projects with the current state of the RTM each time the users check-in and check-out their sub-projects. Additionally, as described herein, a create sub-projects permission can be assigned to enable a user to update sub-projects via the projects module 145. For example, as described herein, affected sub-projects should be updated when their corresponding requirements are modified (e.g., due to the addition or deletion of a user).

The network interface module 160, shown in FIG. 1B, can be configured to enable global distribution of the project and provide integrated processes over the communications network 130 (e.g., a LAN, WAN, the Internet, etc.). In an embodiment, the network interface module 160 can enable the users 135 to check-in and check-out their sub-projects from remote locations. Security measures can be implemented, such as establishing a secure connection and requiring the users 135 to logon and supply a password. Additionally, verification status reports can be made globally available. In these ways, the network interface module 160 can be used to perform synchronous or asynchronous operations and to effect a globally-based dynamically updated requirements matrix (both traceability and verification matrix).

The mapping & analysis module 150, shown in FIG. 1B, can be configured to invoke the static analysis & code coverage tool 120. As described herein, the mapping & analysis module 150 can invoke the static analysis & code coverage tool 120 to map procedures identified in source code to the defined requirements for the project. For the on-line grocery store example, the procedures float MaintainAccountFunction( ), long GetSessionAccountNumber( ), float GetAverageAccountBalance(long accntNum), float GetAccountBalance(long accntNum) void FatalError(const char * msg), void UserMessage(const char * msg) identified in the exemplary source code file "MaintainAccount.c" can be mapped to the high-level requirement "maintain account." For the avionics display system example, the procedures int CheckAvionicsDisplay( ); int BITestModule1( ); int BITestModule2( ); int BITestModule3( ); int BackupModule1( ); int BackupModule2( ); int BackupModule3( ). An exemplary graphical user interface for mapping procedures to requirements is illustrated in FIG. 4G, which is described herein.

Additionally, the mapping & analysis module 150 can enable a user to verify a requirement by identifying an analysis requirement verification method and/or a test requirement verification method. For example, in one embodiment, the mapping & analysis module 150 can be used to invoke the static analysis & code coverage tool 120 to provide integrated analysis capabilities, including analyzing the mapped procedures against project coding rules and quality metrics. Additionally, in another embodiment, the mapping & analysis module 150 can be used to invoke the unit/integration test tool 125 to test the mapped procedures against the requirements, as described herein, by running test cases and generating results that describe code coverage. And in another embodiment, the mapping & analysis module 150 can be used to instrument code that will be executed externally and whose execution results (i.e., code coverage results) can subsequently be returned to the mapping & analysis module 150 for the purpose of post-mortem code coverage analysis.

The verification module 155, shown in FIG. 1B, can be configured to verify the defined requirements based on the results of analyses performed on the mapped procedures by the static analysis & code coverage tool 120, as well as results of the unit testing performed on the mapped procedures by the unit/integration test tool 125. For example, in one embodiment, a user with the necessary permission can use the verification module 155 to select a requirement and view the expected code coverage and the achieved code coverage for the selected requirement (e.g., as percentages of the mapped procedures achieving a desired coverage). If the user is satisfied with the coverage achieved for the selected requirement, the user can maintain the current status of the selected requirement as verified. However, if the user is unsatisfied with the coverage achieved for the selected requirement, the user can change the current status of the selected requirement to unverified. Because un-verifying a requirement modifies that requirement thread, as described herein with respect to the exemplary XML implementation, the user should subsequently update any sub-projects associated with the requirement.

The verification module 155 can also be configured to create groups under a user, and associate requirements with respective groups. Groups have verification rules assigned to them, such that when a requirement is assigned to a group, a sibling requirement for each verification rule is generated for that (base) requirement. With respect to test verification rules, a sibling or verification task is created for each test case associated with the base requirement. All requirements can be ungrouped requirements initially. Requirements can then be associated with one or more groups.

Verification rules specify which verification tasks must be completed before the requirement can be considered verified in this exemplary embodiments. What a requirement must satisfy is determined by the verification group that the requirement is in. Verification rules specify not only what verification task must be done; they also specify who should do them. A verification rule can specify that the requirement pass Code Review, and can further specify that Code Review be performed by a certain user or a user of a certain role (e.g., "Tester" or "QA"). Rules may be sequenced, which forces them to be performed in the order listed in the verification group.

When a verification rule is defined, one or more quality models can be applied. A quality model can set a standard via which the quality of software for a given project can be measure and visualized. A quality model is enforced by the code review and quality review verification tasks.

The code review standards can be defined in a pair of files, a report file (<language>report.dat) and a penalty file (<language>pen.dat). The report file contains the complete set of predefined coding rules. This set of rules can be extended to accommodate a given project. Subsets of the rule set, as defined by published coding standards, are predefined so the user may apply those standards without having intimate knowledge of details of the standard. By viewing the report file, one can see the mapping of these standards to rules and their enforcement. The penalty file can be a legacy mechanism for configuring the code review.

The quality review standards can be defined in 'metpen.dat'. This file contains a series of analysis measurements which are paired with tolerance thresholds. For instance, cyclomatic complexity measurements, code complexity measurements, unreachable lines measurements, comment-related ratios measurements. If the complexity exceeds a certain preset threshold, the quality review report will flag it accordingly. As with the 'report.dat' file used for code review, the 'metpen.dat' file may be customized to meet a project's needs.

The selection of different quality models can be achieved via combinations of verification rules assigned to groups. When sibling requirements are invoked for code or quality review, the appropriate quality model is applied for testing.

As mentioned above, a sibling requirement of a verification task is generated for every verification rule that the base requirement must satisfy. For example, if a requirement's verification rule stipulates that it pass code review, then a sibling is made, and if the sibling passes code review, then the requirement is considered as passing code review.

Accordingly, the automated requirements verification tool 115 can be employed in a software development project to enable automated integration of requirements-based development and verification processes and provide global access to a dynamically-updated traceability and verification requirements matrix to all members of a project team, including management. As described herein, in one embodiment, the automated requirements verification tool 115 can be implemented using the extensible markup language (XML).

In order to automate and make a repeatable process of requirements traceability, a triangulation of the test verification process must be supported. This triangulation includes three vectors: the mapped requirement (a static association including a procedure, an aggregation of procedures, a class or any implementation artifact), the structural coverage (a dynamic metric of code coverage and test case execution) and the test case (the functionality to be exercised). The realization of requirement traceability is greatly complicated by software programming abstractions such as overloading, multiple inheritance, generic parameterizations and dynamic dispatch tables. The present invention achieves this traceability by integrating its static and dynamic vectors as dictated by the required functionality. The traceability facilitated by the invention, including the use of the static analysis & code coverage tool 120, is extended to instances of the software and its run time artifacts. In addition to the mapped requirement, the test case (or use case) must be explicitly mapped as a predicate for any test-based verification task to be performed.

Process Overview

Figure 2:
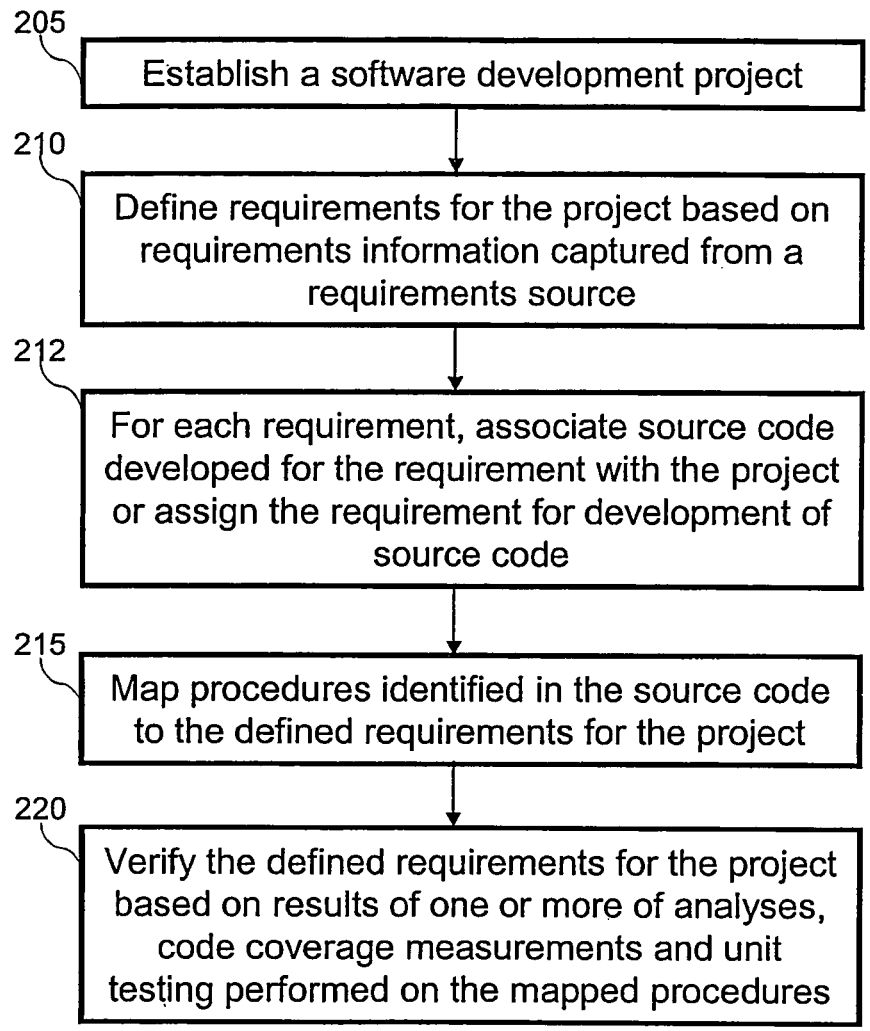
FIG. 2 illustrates a process flowchart providing exemplary steps for a method of automatically managing software requirements verification.

FIG. 2 illustrates exemplary steps for a process 200 for electronically managing requirements for software development. Not all of the steps of FIG. 2 have to occur in the order shown, as will be apparent to persons skilled in the art based on the teachings herein. Other operational and structural embodiments will be apparent to persons skilled in the art based on the following discussion. These steps are described in detail below.

In step 205, a software development project is established. For example, the projects module 145, described in conjunction with FIG. 1B, can be employed to implement step 205. In an embodiment, step 205 includes identifying users for the project. In another embodiment, step 205 includes creating a plurality of roles for the project based on groups of the users who are designated to perform similar actions. For example, a project manager role can be created having permission to exercise control over the process 200, and at least one additional role can be created, such as a developer role, a test engineer role, an independent verification and validation role, and a quality assurance role. In this embodiment, step 205 can include assigning permissions to the roles to define the actions that the users can perform, such as a create low-level requirements permission, a create derived requirements permission, a make sub-projects permission, an edit thread properties permission, and a manual verification permission, and step 205 can also include selecting roles for the users.

In step 210, requirements for the project are defined based on requirements information captured from a requirements source. For example, the requirements module 140, described in conjunction with FIG. 1B, can be employed to implement step 210. In one embodiment, step 210 includes capturing high-level requirements for the project based on the requirements information, and defining at least one additional requirement for the project based on the requirements information. The additional requirement(s) can define a low-level requirement that fulfills part of a captured and allocated high-level requirement for the project, a derived requirement that is inferred from a defined high-level requirement or low-level requirement for the project, and/or a sibling requirement that is a copy of a defined high-level, low-level, or derived requirement for the project. Additional requirements information can include test cases associated with any given requirement. In the absence of test cases defined as part of the original requirements information, the user must enter a test case before performing a test-based verification task.

In step 212, for each requirement, source code already developed for the requirement is associated with the project. For example, the projects module 145, described in conjunction with FIG. 1B, can be employed to implement step 212. Additionally, if source code is not already developed for a requirement, step 212 can facilitate requirements-based development in which requirements assignment is a precursor to source code implementation. In this embodiment, the association of source code with a project does not occur until step 215. In step 212, corresponding sub-projects can be established when assigning the defined requirements for the project to the users.

Optionally, the process 200 can include the additional steps of generating a status report for a user summarizing the defined requirements assigned to the user, and updating the status report during the project to include corresponding results of the analyses, code coverage and the unit testing.

In step 215, procedures identified in the source code are mapped to the defined requirements for the project. For example, the mapping & analysis module 150, described in conjunction with FIG. 1B, can be employed to implement step 215. In one embodiment, step 215 includes invoking a static analysis tool, such as the static analysis & code coverage tool 120 described in conjunction with FIG. 1A, to analyze the source code to identify the procedures in the source code. In this embodiment, the static analysis tool can also be invoked to perform analyses on the source code, including applying project coding rules and quality metrics to the associated source code files. Moreover, this static analysis & code coverage tool 120 can be used to instrument and measure code coverage in tests run externally. In another embodiment, step 215 includes invoking a unit test tool, such as the unit/integration test tool 125 described in conjunction with FIG. 1A, to run test cases on the mapped procedures.

In step 220, the defined requirements for the project are verified based on results of one or more of analyses, code coverage measurements and unit testing performed on the mapped procedures. For example, the verification module 155, described in conjunction with FIG. 1B, can be employed to implement step 220. In one embodiment, step 220 includes verifying the defined requirements for the project if results of the analyses indicate conformance of the source code to the project coding rules and the quality metrics. In this embodiment, the non-conformances can be tracked based on the results of the analyses, and the non-conformances, including providing information regarding disposition of the non-conformances, can be reported. In another embodiment, step 220 includes verifying the defined requirements for the project if the test cases generate desired results.

In yet another embodiment, step 220 includes the additional steps of providing a status of the defined requirements for the project indicating whether each of the defined requirements is verified or unverified, and generating an integrated requirements traceability and verification matrix to dynamically track implementation of the defined requirements and the status of the defined requirements. In this embodiment, sub-projects for the project can be established by assigning the defined requirements for the project to users working on the project, and the sub-projects can be synchronized with the integrated requirements traceability and verification matrix.

Optionally, the process 200 further includes the step of enabling the users to access the project via a communications network. For example, the network interface module 160, described in conjunction with FIG. 1B, can be employed to implement the networking step. In an embodiment, the integrity of the requirements traceability and verification matrix can be maintained by monitoring when the users check-out and check-in their corresponding sub-projects over the communications network. In other words, the process 200 can support a unit test workflow scenario that includes requirements traceability and test verification through high-level, low-level and derived requirements and facilitates the mapping of these requirements with source code procedures or methods. The mapped requirements can subsequently be made available to a developer or a tester for the purposes of test specification creation and test verification. The process 200 can also facilitate the creation of test cases from these test specifications. The process 200 can automatically trace the results of this unit test scenario back to the requirements sources to ensure requirements traceability matrix (RTM) integrity and user workspace (e.g., project/subproject) security and flexibility in its deployment. In an embodiment, a user can operate on a "checked-in" sub-project, where all tasks performed by the user can be dynamically tracked and updates to the RTM can be synchronized, or the user can operate on a "checked-out" sub-project, where verification tasks can be performed at any location and results can be subsequently synchronized with the current RTM when the user returns to operate on a checked-in sub-project.

Detailed Description of Exemplary XML Implementation

As described herein, the automated requirements verification tool 115 and the automated requirements management process 200 can be employed in a software development project to bridge the gap between high-level requirement traceability tools and low-level code testing tools and, in one embodiment, can be implemented using XML constructs.

For example, requirements management data can persist in an XML construct called a "thread," so that each requirement that is tracked has one corresponding XML thread. In this way, as referred to herein, the terms "thread" and "requirement" can essentially be interchangeable, except a thread more accurately describes a requirement-based task and more. For example, as shown in FIG. 3A, a thread 305 can include metadata describing the requirement and its relationship to other requirements 310, as well as prototype information regarding procedures in source code files that are mapped to the requirement 315 and analysis and test result information 320 pertaining to verification of the requirement. All prototype information can be kept in the thread itself, including the code coverage information using a <Prototype></Prototype> XML block.

Figure 3C:
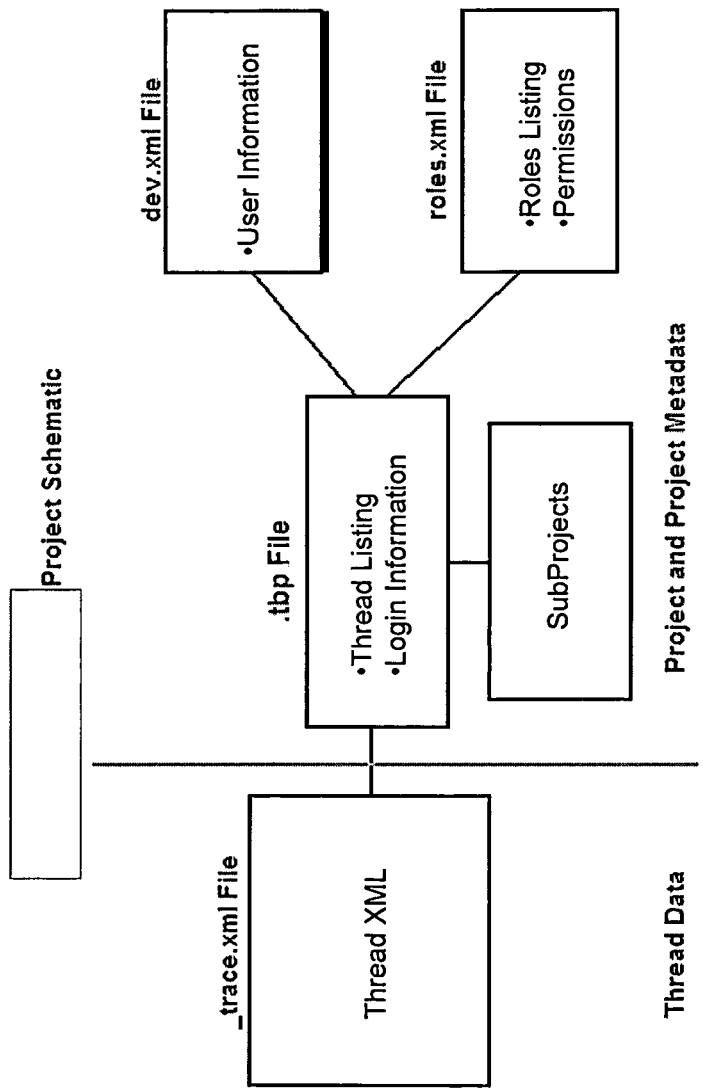

With the exception of hierarchical information (i.e., thread relationship data can be contained in the threads themselves, but all the threads taken together form a cohesive hierarchy), all pertinent information about a thread can be contained in the thread itself. In this way, a thread can largely be a self-contained object, enabling a program to use thread information sensibly without any knowledge of the project the thread belongs to, including user, role, and permission information. For example, FIG. 3C illustrates a project schematic 340 and shows that a thread XML file 345 can be independent from project XML files 350, 355 and 360 that can be used to create a cohesive project and to present the thread information to the users in a useful and intuitive manner.

The thread definition itself can specify a minimum number and arrangement of fields (also called "elements" when speaking within an XML specific context), which must exist for the data aggregation to be called a "thread" proper. Whether the information put into those fields has any correlation with real-world data is beyond the scope of the thread definition. The definition of a thread is dependent only upon a unique reference identifier (e.g., ref=" " metadata) and not upon the actual string used to make the threads human-readable.

FIG. 3B illustrates how a thread XML file 335 can be manipulated by a calling application/program 325 through an XML wrapper class called CXMLWrapper. While it can be possible to read and write directly from/to threads, the CXMLWrapper can be used to enforce the ref=" " XML conventions, thereby ensuring that threads are written and re-written in a consistent, standards-conforming manner.

Figure 3D:
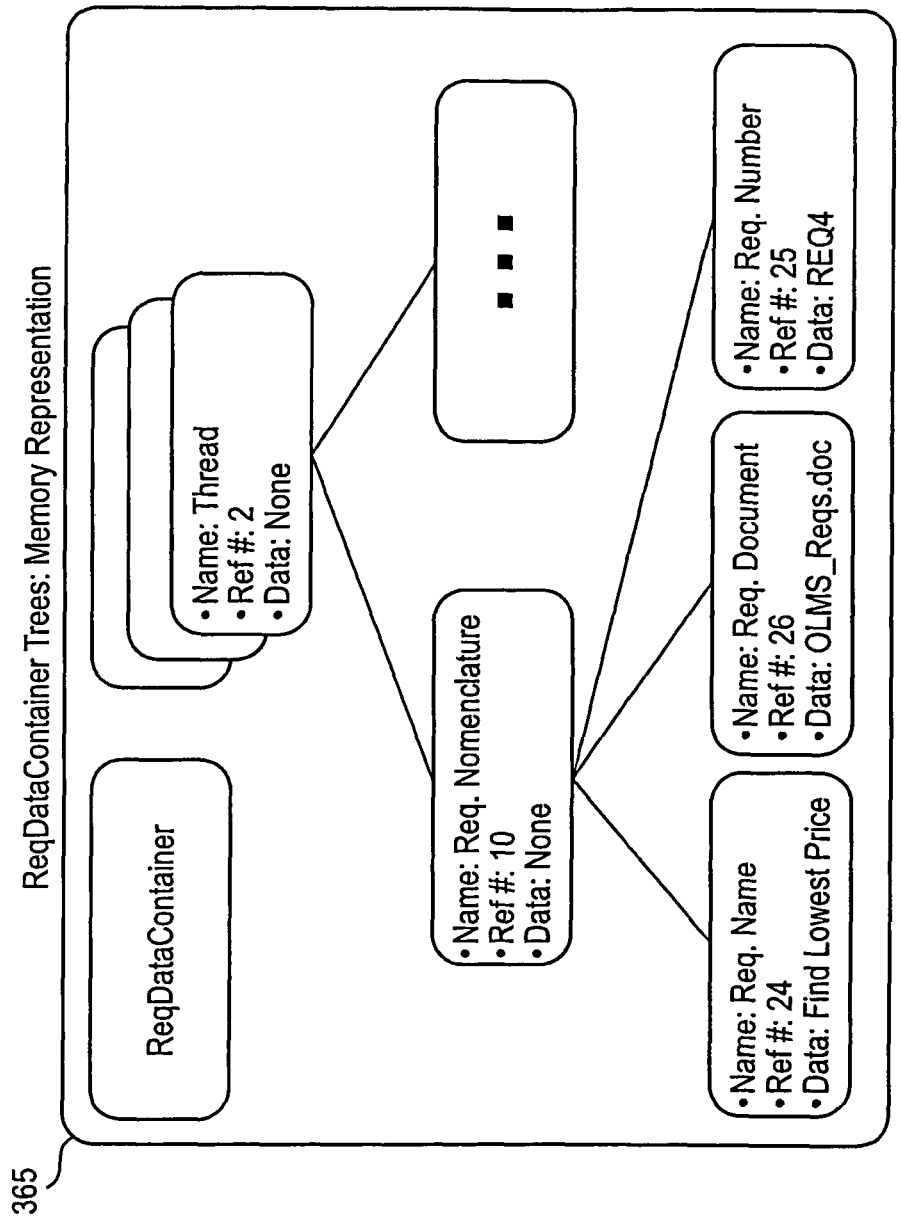

FIG. 3D illustrates an exemplary representation of a thread in memory. The CXMLWrapper class is based on the CGenericXMLWrapper XML wrapper class, which can be implemented to convert an XML file into a hierarchical tree of objects called ReqDataContainers 365. Conceptually, a ReqDataContainer 365 can maintain hierarchical information about itself (e.g., who its parents and children are) and about its own data (e.g., name, unique reference identifier, and data). The CGenericXMLWrapper class can create one ReqDataContainer for each element encountered while reading an XML file. The element's name and unique reference number can be stored, in addition to any data. Hierarchical information can be contextually determined based on relevant factors such as, whether the element has data and the parent element, among other factors. Thus, in the tree of ReqData-Containers, each ReqDataContainer can be analogous to a node with pointers to its siblings in the tree.

In the event an element is encountered that does not have a reference number, a reference number can be assigned to the element, beginning at a reasonably high "unknown floor." Thus, a program wishing to retrieve the element's data must know the value of the unknown floor ahead of time, which can be defined in the XMLWrapper.h class, in addition to other factors regarding how many unreferenced elements are being read and have been read. In practice, it can be more effective to define a thread tree by using a unique reference number (or other unique identifier) for each of the elements of a thread instead of relying on automatic assignment of reference numbers. Automatic assignment of reference numbers can be effective, however, to prevent a situation where an entire thread (or _trace.xml file) cannot be accessed because a faulty portion of a program did not assign a reference number to one of its new elements.

Once the CGenericXMLWrapper class creates a ReqData-Container tree, as shown in FIG. 3D, a calling program can have complete freedom to modify the ReqDataContainer tree. For example, a calling program can add or remove ReqData-Containers and modify data in existing ReqDataContainers. After a calling program has finished modifying a ReqData-Container tree, it can call an XML method of the wrapper class called WriteAsXML( ) to have the wrapper class convert the ReqDataContainer tree back into an XML file and write the XML file to a storage device.

ReqDataContainers 365 can be designed to mimic XML as much as possible. ReqDataContainers need not be categorized based on whether they have data, children, siblings, or any other contextual property. In practice, however, some distinctions among the ReqDataContainers should be implemented so that the data can be organized accordingly.

The flexible nature of a ReqDataContainer tree implementation can permit different programs to add their own data to the thread without interfering with each other. For example, in one embodiment, defect tracking information and function prototype XML blocks can be added to a thread's "scope" without obfuscating its primary payload, the individual requirement. These are examples of data that is added to threads as individual traceability needs arise (in this case, the extension of verification down to individual functions), and in this way, the approach of encapsulating all data related to the requirement and its traceability information into a single thread can enable flexibility and freedom for user programs. The ReqDataContainer tree implementation can also define a standard way of encoding data. In this way, programs which want to take advantage of features offered by other programs need only understand the XML block convention used in order to build their own functionality around it.

In one embodiment, classes called RDCPtr, iRDCPtr, and CWrapperLibrary, can be implemented to (1) organize iterated XML blocks into "stacks" of "vertical data" to avoid the need for contact with a parent node, (2) enable sequential accessing of siblings without the need for communicating with the parent node, and (3) provide a one-to-one correlation between a ReqDataContainer and a single element of a stored XML file.

Avoiding reliance upon parent nodes for information about child hierarchical relationships can improve the integrity of the code. For example, programs typically need access to all instances of a certain XML block, such as getting prototype information out of a thread. A pseudocode representation of a function which gets prototype information from a thread without using the RDCPtr class can be expressed as follows:

```
ReqDataContainer prototype_parent =
    current_thread.GetElement(REF_TEST_SPECIFICATION);
ReqDataContainer prototype =
    prototype_parent.GetElement(REF_PROTOTYPE);
while (prototype != NULL) {
  PrintPrototypeInfo(prototype);
  prototype = prototype_parent.NextElement(prototype);
}
```

A pseudocode representation of a function which gets prototype information from a thread using the RDCPtr class can be expressed as follows:

```
RDCPtr prototype = current_thread.-
    GetElement(REF_TEST_SPECIFICATION).-
    GetElement(REF_PROTOTYPE);
while (prototype != NULL) {
  PrintPrototypeInfo(prototype);
  prototype = prototype.GetNext( );
}
```

Figure 3E:
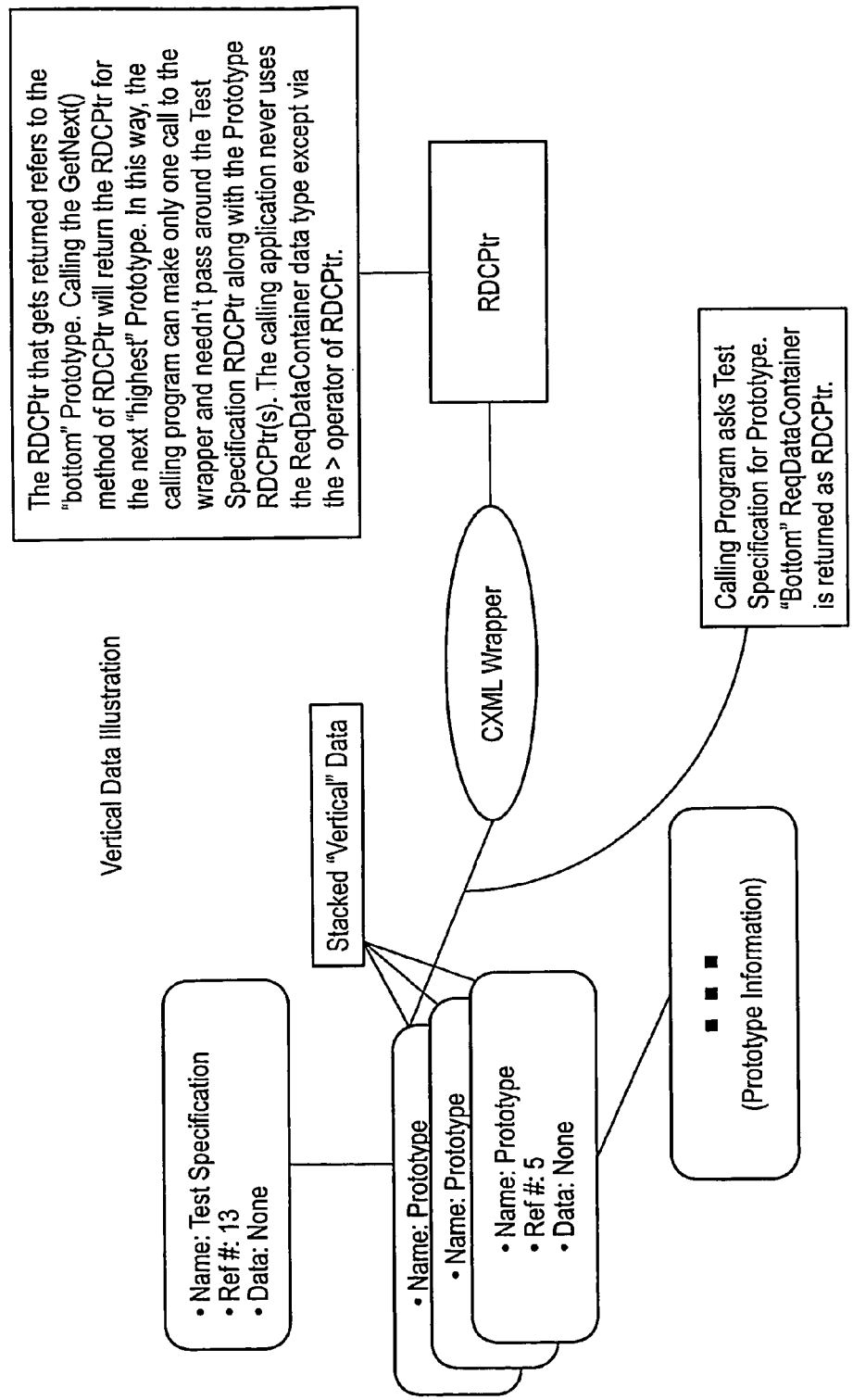

The improvement with regard to code cleanliness between the two implementations can be significant considering that this "list" of prototypes that a thread possesses can be passed around, in its entirety, by passing only the RDCPtr of the first prototype because the first prototype in the list knows the location of the other prototypes. Thus, instead of a function passing around two ReqDataContainer pointers (i.e., one for the element and one for its parent), only one RDCPtr object need be passed around for every function to have access to all the prototypes. Further, the wrapper class only has to service one application call (i.e., the call which gets the first prototype) and will not need to service other calls to get any additional prototype information. In this way, iterated blocks of XML data can be represented as "vertical" data, as shown in FIGS. 3D and 3E. The first prototype can be treated like any other block of XML, and subsequently read prototype blocks can be "stacked" on top of the first prototype. The RDCPtr class embodies this concept of stacks of ReqDataContainers.

Thus, the calling program need not interact with a Req-DataContainer directly. All data access can be accomplished via RDCPtrs, which can enable the unique "vertical data" stacking mechanism shown in FIGS. 3D and 3E. Because of their usefulness as smart pointers, RDCPtrs can provide exclusive means of accessing ReqDataContainers. Even if an element has no vertical data (i.e., there is only one iteration of the element), it can still be returned as an RDCPtr. Thus, functions do not need to be overwritten to accept both Req-DataContainers and RDCPtrs, all functions can simply accept an RDCPtr. By passing around one relatively small RDCPtr, the entire calling program can have random or sequential access to the entire vertical stack of data. This feature can enable easier, cleaner, and more concise code implementation. Furthermore, by using RDCPtrs, the calling program need not create or delete ReqDataContainers into or from memory, which can be all handled automatically, as described herein.

The iRDCPtr class can provide a mechanism for organizing ReqDataContainers "left and right" into lists. The iRD-CPtr class is not used by calling programs but can be used by the backend (e.g., the wrappers used to interface with the XML files) to enable sequential searching through siblings and writing recursive algorithms to search through the ReqDataContainer tree (ReqDataContainers do not keep track of their "siblings" in the ReqDataContainer tree). Calling programs can access a child of a ReqDataContainers by index (i.e., by unique reference identifier) and cannot sequentially search through the children of a ReqDataContainer to find the child it needs but, for internal processes, the CGenericXMLWrapper can use iRDCPtrs to sequentially search through the children of a ReqDataContainer.

Calling programs should use CWrapperLibrary class to get a wrapper for an XML file. For memory management purposes, the automated requirements verification tool 115 and its backend can use a class to manage allocation and deletion of resources. For example, the CXMLWrapper class can be used to create the ReqDataContainers, RDCPtrs, and iRDCPtrs needed. A calling program can obtain RDCPtrs upon request, and the entire XML file, as represented by the CXMLWrapper, can be created and deleted with the CXMLWrapper. The CXMLWrapper, in turn, can register all objects (e.g., ReqDataContainers) it creates with a GlobalRDCPool object, which can be emptied by the calling program when it exits.

Further, the automated requirements verification tool 115 and its backend can use a class called CWrapperLibrary to manage CXMLWrappers in the same way that the GlobalRDCPool class manages RDCPtrs. With CWrapperLibrary, a calling program need not create a wrapper at all. Rather, the calling program can request the ReqDataContainer tree for an XML file. If the ReqDataContainer tree has not yet been built for the requested XML file, the CWrapperLibrary class can be used to create a wrapper, have the wrapper build the ReqDataContainer tree, and pass back to the calling program a pointer to the created wrapper. In this way, CWrapperLibrary can organize all the CGenericXMLWrappers that a calling program is using. For example, if the calling program requests a wrapper that corresponds to "file1_trace.xml," CXMLWrapper can search a library of already-built wrappers for a CXMLWrapper object for file1_trace.xml. If a CXMLWrapper object for file1_trace.xml has already been built, CXMLWrapper can simply pass a pointer to the already-built CXMLWrapper back to the calling program, otherwise CWrapperLibrary can make a new CXMLWrapper for file1_trace.xml and pass a pointer to the new object back to the calling program.

Like RDCPtrs, CXMLWrapper hides allocation of memory from the calling program, so the calling program is not responsible for freeing the object that CWrapperLibrary passes back. Also, when a calling program uses CWrapperLibrary, all parts of the program can be certain to be working on the same ReqDataContainer tree (a ReqDataContainer is a single element in an XML file, so a tree of ReqDataContainers represents the entire XML file) and the calling program does not have to implement synchronization across the program.

Typically, a calling program will call the GetFile( ) method to retrieve the RDCPtr for the file's root element and will not make any further calls to the wrapper. The calling program does not delete the created wrapper. Instead, the EmptyWrappers( ) method (which also writes all opened wrappers to a storage device) can be used to delete wrappers vicariously. In this way, the CWrapperLibrary class can be used to ensure that all parts of the automated requirements management program are working on the same ReqDataContainer tree and to facilitate memory management.

The memory management classes, when used together, can result in an unbroken persistence of RDCPtrs (i.e., the RDCPtr a calling program receives at the beginning of a session is the same RDCPtr the calling program would receive later in the session) to enable parts of the calling program, which use the same GlobalRDCPool and CWrapperLibrary, to pass RDCPtrs around. Therefore, when the calling program decides to ask the memory management classes to empty themselves can be an important decision. For reasons of memory usage, under certain situations, it may even be desirable to force-empty wrappers and RDCPtrs. This memory management technique can result in an increase in memory usage for the program's lifecycle. Once memory usage reaches a certain level, it is unlikely to increase further, but for programs that might in their lifecycles incur the opening of dozens or even hundreds of XML files, force-emptying the memory management classes can be beneficial. Care should be taken, however, that references to resources managed by the memory management classes are no longer needed after emptying them.

In one embodiment, the threads can be converted into a SQL format for storage and access over a global network. This process can be supported by a web service that accepts upload requests from the automated requirements verification tool 115. This same web service can generate traceability and verification reports upon request from web users. Additionally this web service can accommodate download requests to the automated requirements verification tool 115. As a consequence of these web services, global project synchronization can be facilitated.

Exemplary Graphical User Interface Implementation

FIGS. 4A-4J illustrate an exemplary implementation of a graphical user interface (GUI) for a software requirements management tool TBmanager™ developed by LDRA™. TBmanager™ can be employed to facilitate management and allocation of software requirements for development, testing and verification purposes. Persons skilled in the art will understand that the GUI design need not be limited to the design illustrated in FIGS. 4A-4J and that other GUI designs can be implemented. In this embodiment, a project file (e.g., having a ".tbp" extension) can first be created using a requirements capture tool, such as TBreq™, developed by Geensys™, which can capture requirements information for a software development project from sources of requirements information such as Telelogic DOORS® or IBM Rational RequisitePro®, MS Excel®, MS Word®, among other sources of requirements information.

Defining Roles and Users

Figure 4A:
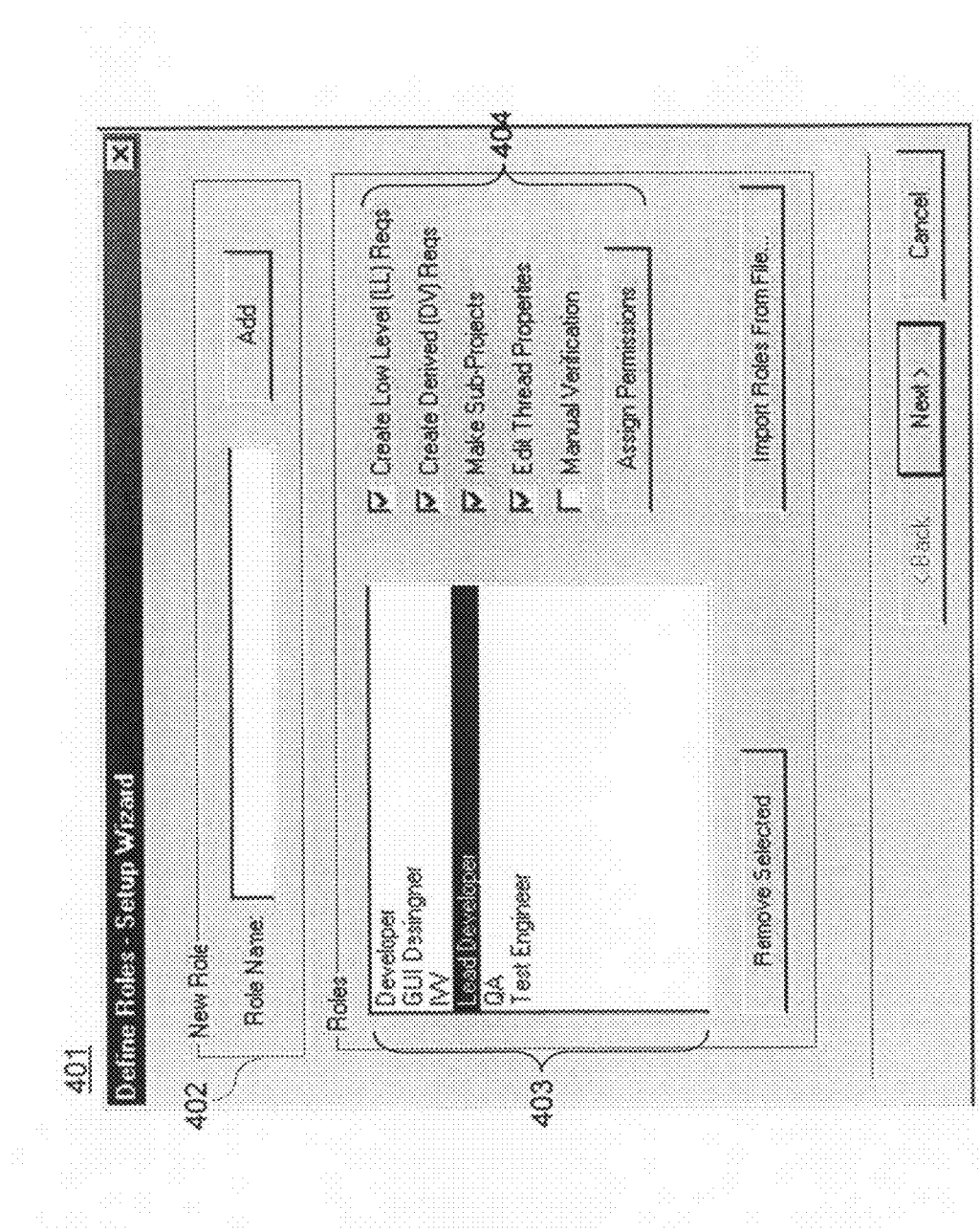

FIG. 4A illustrates an exemplary GUI 401 for defining roles for the project during an initial set-up. Roles can be used to group together users who perform similar or related tasks; for example, a role can be created and applied to all of the developers of a project. Each user can be assigned one role. One user can assume the role of project manager. The project manager role can exercise control over every aspect of the requirements management process and can be responsible for creating roles and users and for delegating requirements. For example, the project manager can create and assign a role to grant other users the ability to create roles and users and to delegate requirements.

As shown in FIG. 4A, a New Role field 402 of GUI 401 can be used to enter the name of a new role, and the new role can be added by pressing the Add button. Exemplary roles 403 can include a developer role, a GUI designer role, an independent verification and validation (IVV) role, a quality assurance (QA) role, and a test engineer role, among others. As shown in FIG. 4A, the Remove Selected button can be used to remove an added role, and the Import Roles From File button can be selected to import roles that have been defined in a text file or in another project.

Permissions can be assigned to the roles to enable different levels of functionality for corresponding users, such as by defining the requirements information that the users can access and the actions that they can perform. As shown in FIG. 4A, the Assign Permissions button can be used to assign permissions to the roles 403. Exemplary permissions 404 can include, among others, "Create Low Level (LL) Reqs," which can be assigned to a role to enable corresponding users to create low-level requirements, "Create Derived (DV) Reqs," which can be assigned to a role to enable corresponding users to create derived requirements, "Make SubProjects," which can enable corresponding users to assign users to requirements for the project, "Edit Thread Properties," which can be assigned to a role to enable corresponding users to edit available requirement attributes via a Requirements View described herein, and "Manual Verification," which can be assigned to a role to enable corresponding users to access to a Verification View described herein.

Roles can be used to diversify allocated requirements among users. In this way, the same requirement (via sibling requirements) can be assigned to two or more users of differing roles, while maintaining traceability of development and verification tasks. For example, the same requirement can be assigned to a developer for coding, QA for testing and IVV for independent validation and verification.

Figure 4B:
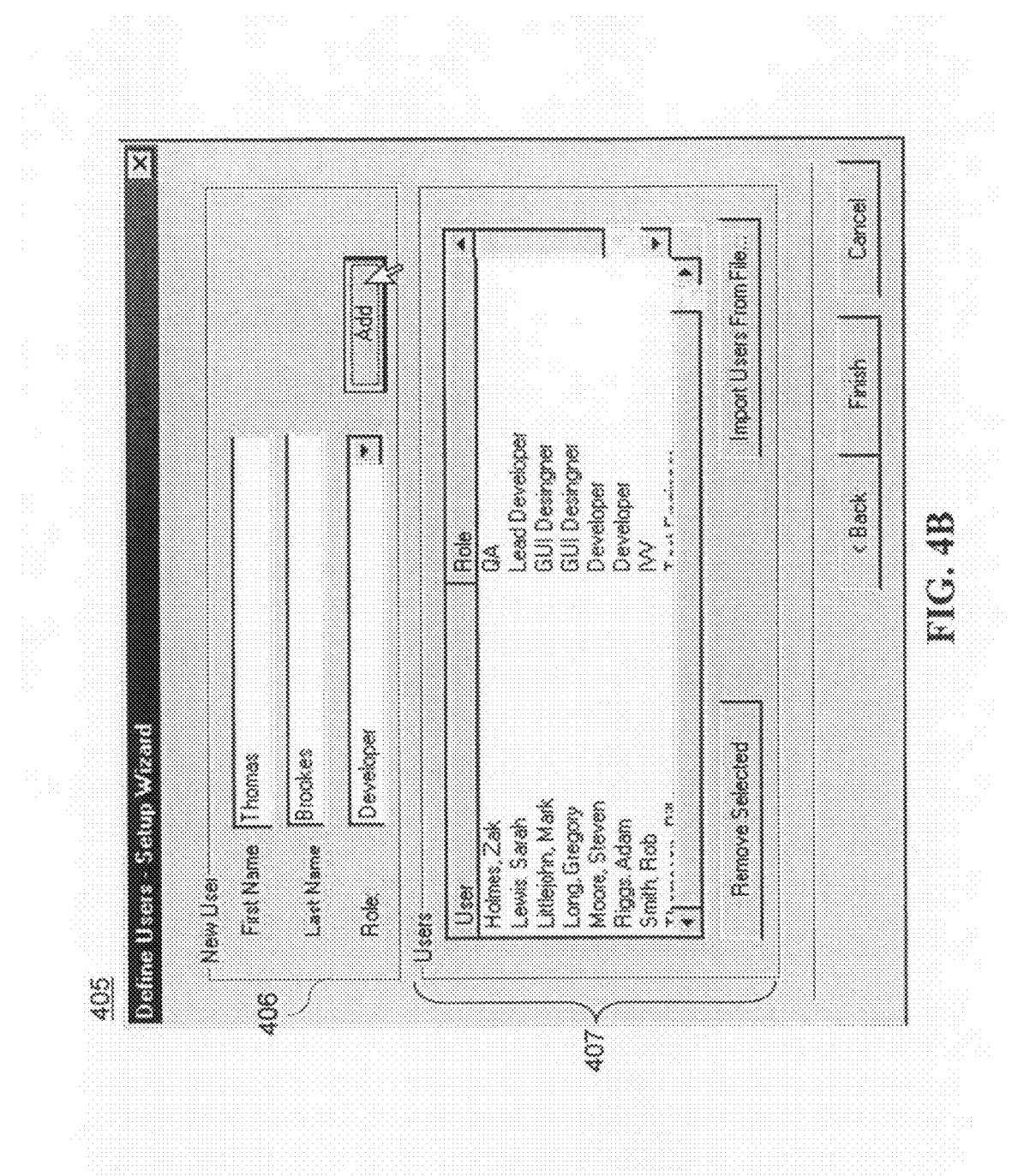

Similarly, FIG. 4B illustrates an exemplary GUI 405 for defining users for the project. As shown in FIG. 4B, a New User field 406 can be used to enter the name of the new user and to select a corresponding role for the new user, and the new user can be added by pressing the Add button. The added users can be displayed in a Users field 407. A Remove Selected button can be used to remove an added user from the project, and an Import Roles From File button can be selected to import users previously defined in another file.

Adding news users and roles after setup can be performed safely, when followed by a sub-project update, as described herein. However, once requirements have been assigned to users, as described herein, users and roles should not be deleted. For example, deleting a role can result in a user losing necessary permission to work on the project and deleting a user can result in a requirement being unassigned. Accordingly, care should be taken when deleting roles and users.

Parsing Based on Types View

Figure 7:
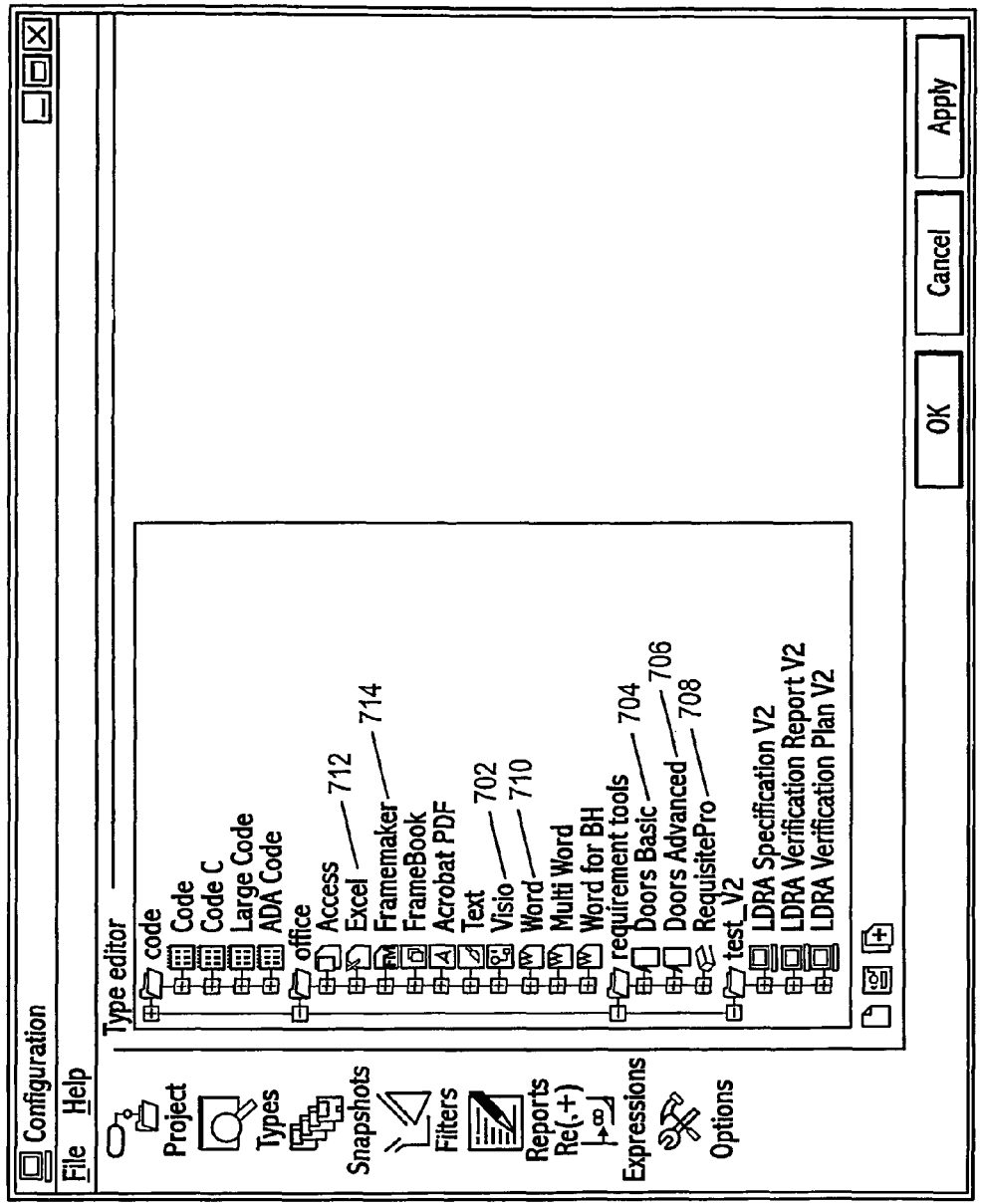
FIG. 7 illustrates an example of parsing based on types.

Requirement documents can be imported and parsed. The parsing can be performed based on types. A parsing schema must be described in a Types file. As illustrated in FIG. 7, many types files can be predefined, covering commonly used tools such as diagramming software, e.g., Visio 702; requirement management tools, e.g., DOORS 704 and 706, and Rational Requisite Pro 708; word processing programs, e.g., MS Word 710; spreadsheet programs, e.g., Excel 712, and authoring and publishing software, e.g., Framemaker 714. The types file can be a converter so that it can understood how requirements are described in the reference document.

Figure 8:
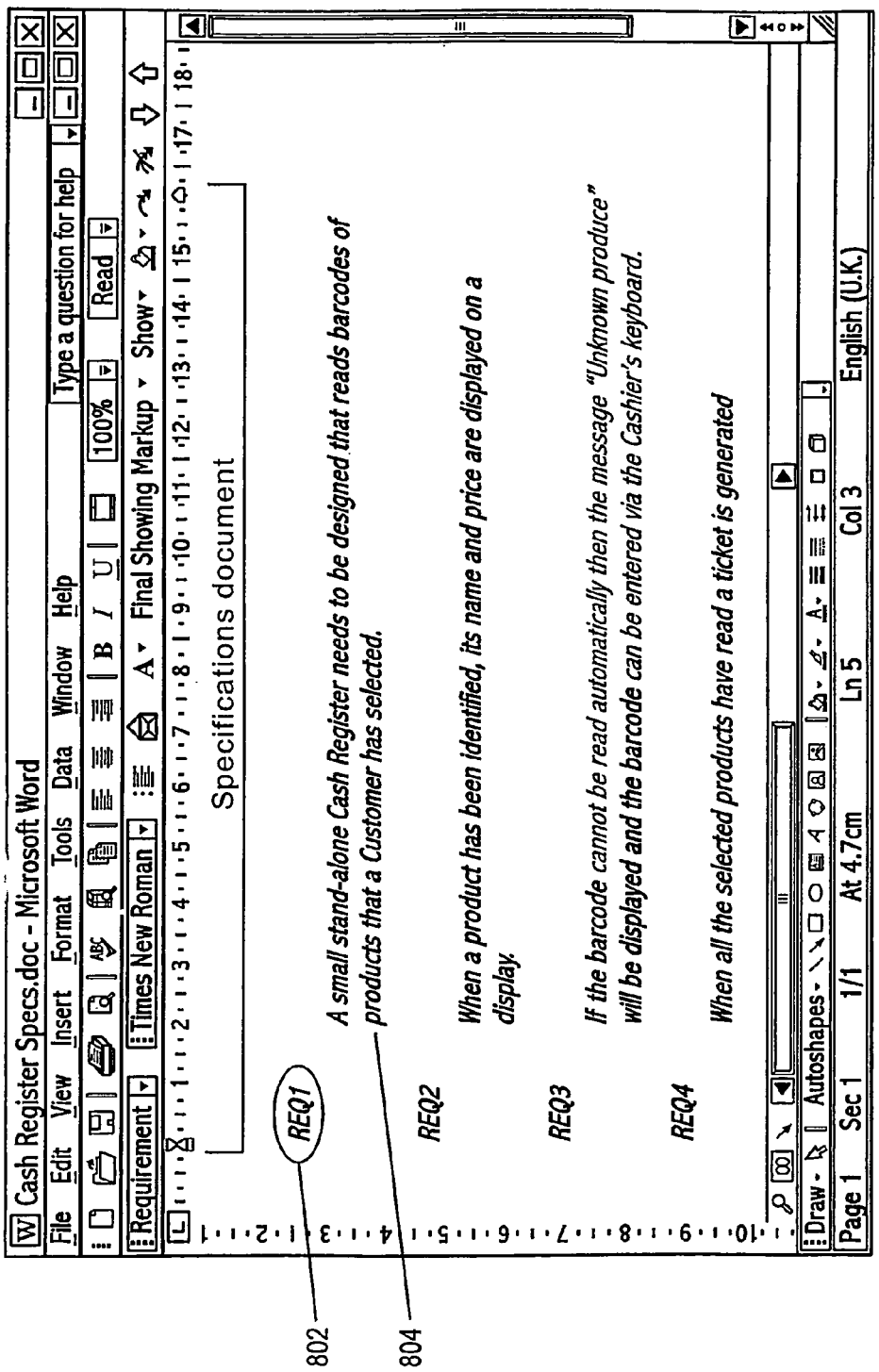
FIG. 8 illustrates an example of requirements in an Microsoft (MS) Word file.

FIG. 8 illustrates an example of requirements in an MS Word file. As illustrated in FIG. 8, appropriate styles must be applied to the requirement ID 802 and requirement text 804 so that the document can be parsed as the author intends.

Figure 9:
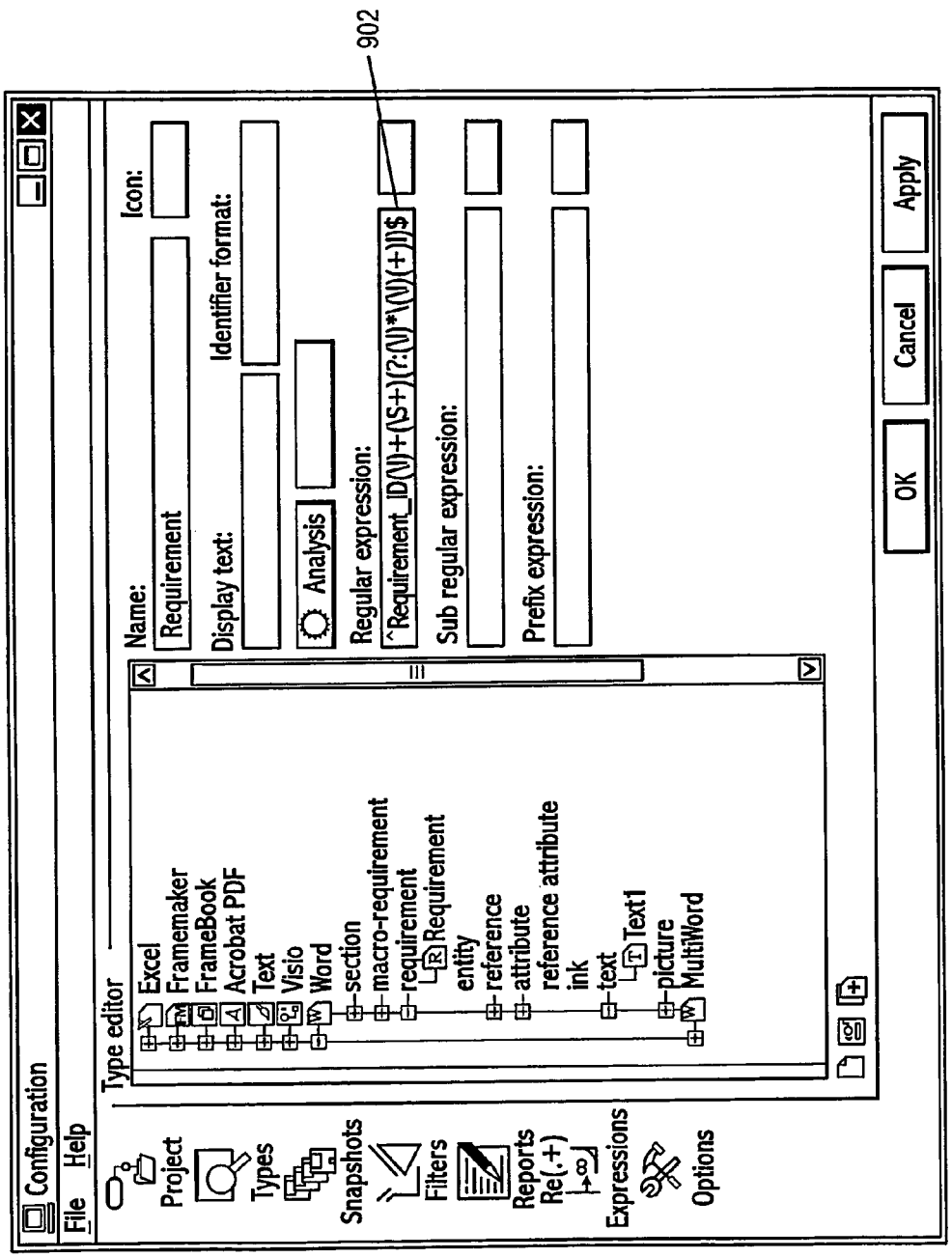
FIGS. 9 and 10 illustrate examples of a type editor.
Figure 10:
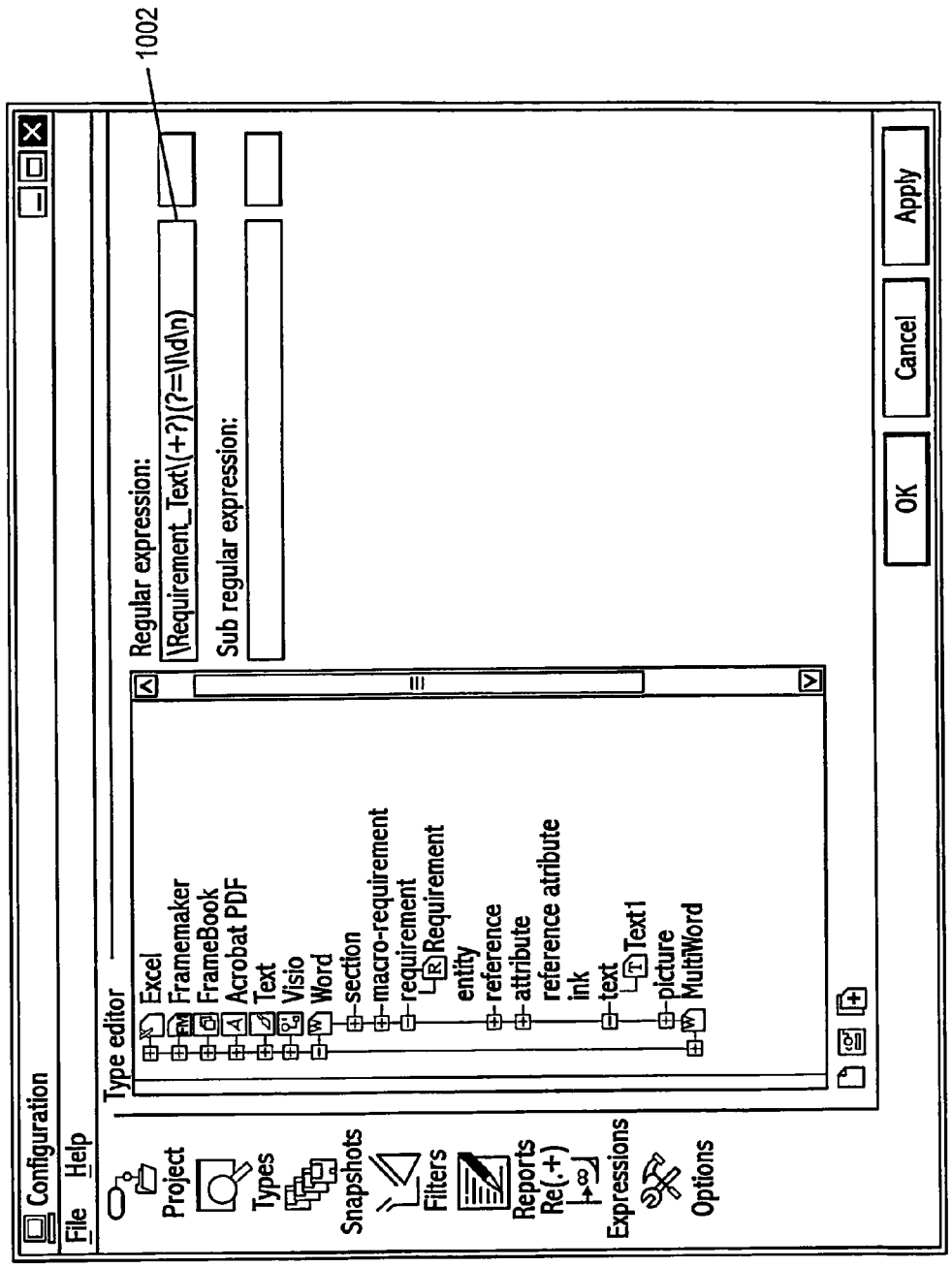

FIGS. 9 and 10 illustrate examples of a type editor. The MS Word style used in the document, including the requirement ID 802 and requirement text 804, must be described in the type editor fields 902 and 1002, so that the MS Word file can be parsed correctly.

Groups View

Figure 5:
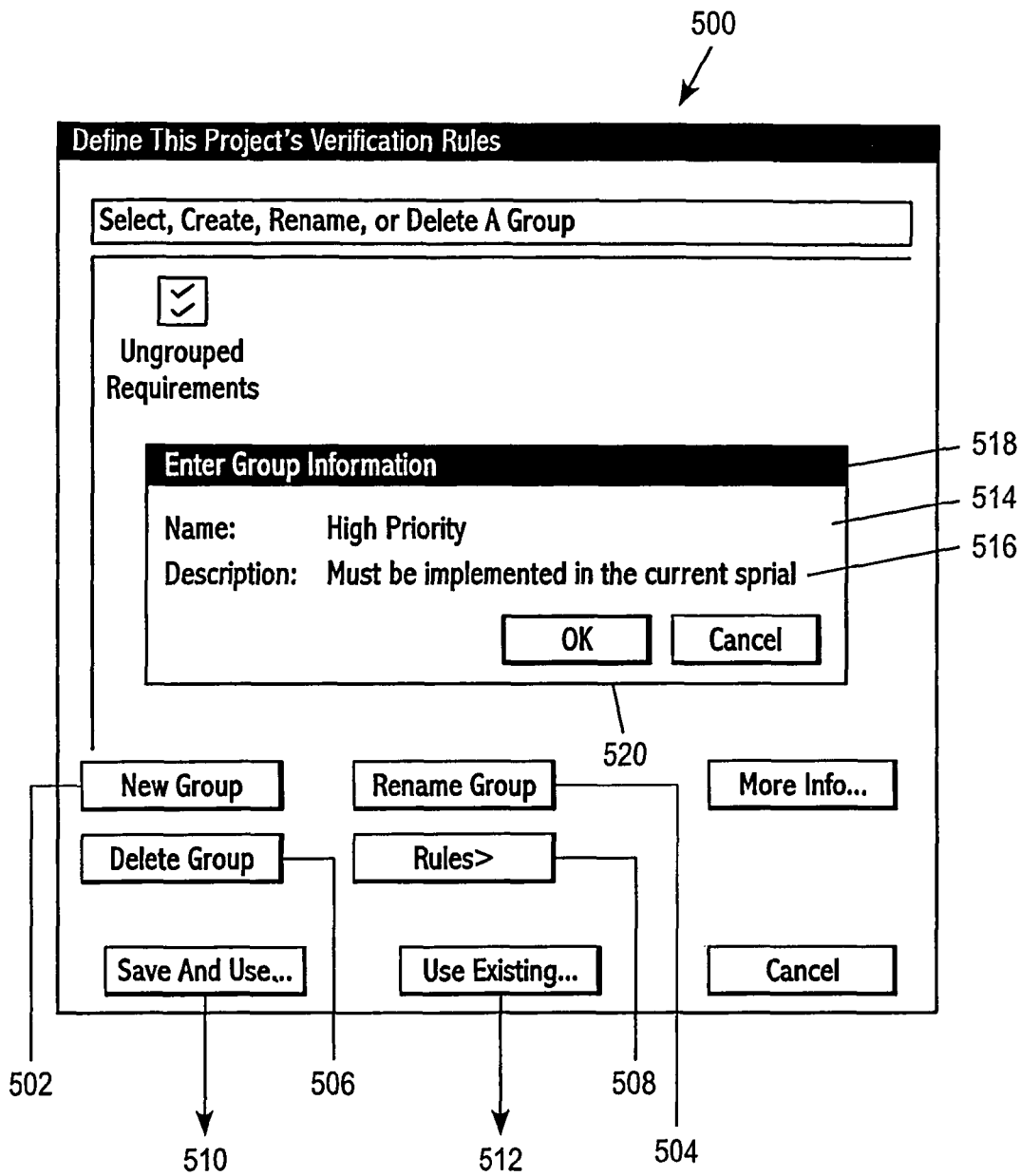
FIG. 5 illustrates an example of selecting, creating, renaming or deleting a group view.

Verification Groups for a project can be created under a user. FIG. 5 illustrates an example of selecting, creating, renaming or deleting a group view in a "Verification Groups" dialog 500. Referring to FIG. 5, a verification group is created by clicking the "New Group" button 502. A dialog box "Enter Group Information" 518 appears when the "New Group" button 502 is clicked. The name of the verification group can be entered in the name text field 514. In this example, the group name "High Priority" is entered in the name text field 514. In addition, description "Must be implemented in the current spiral" is entered in the description text field 516. When the "OK" button 520 is clicked, a verification group is created.

Figure 6:
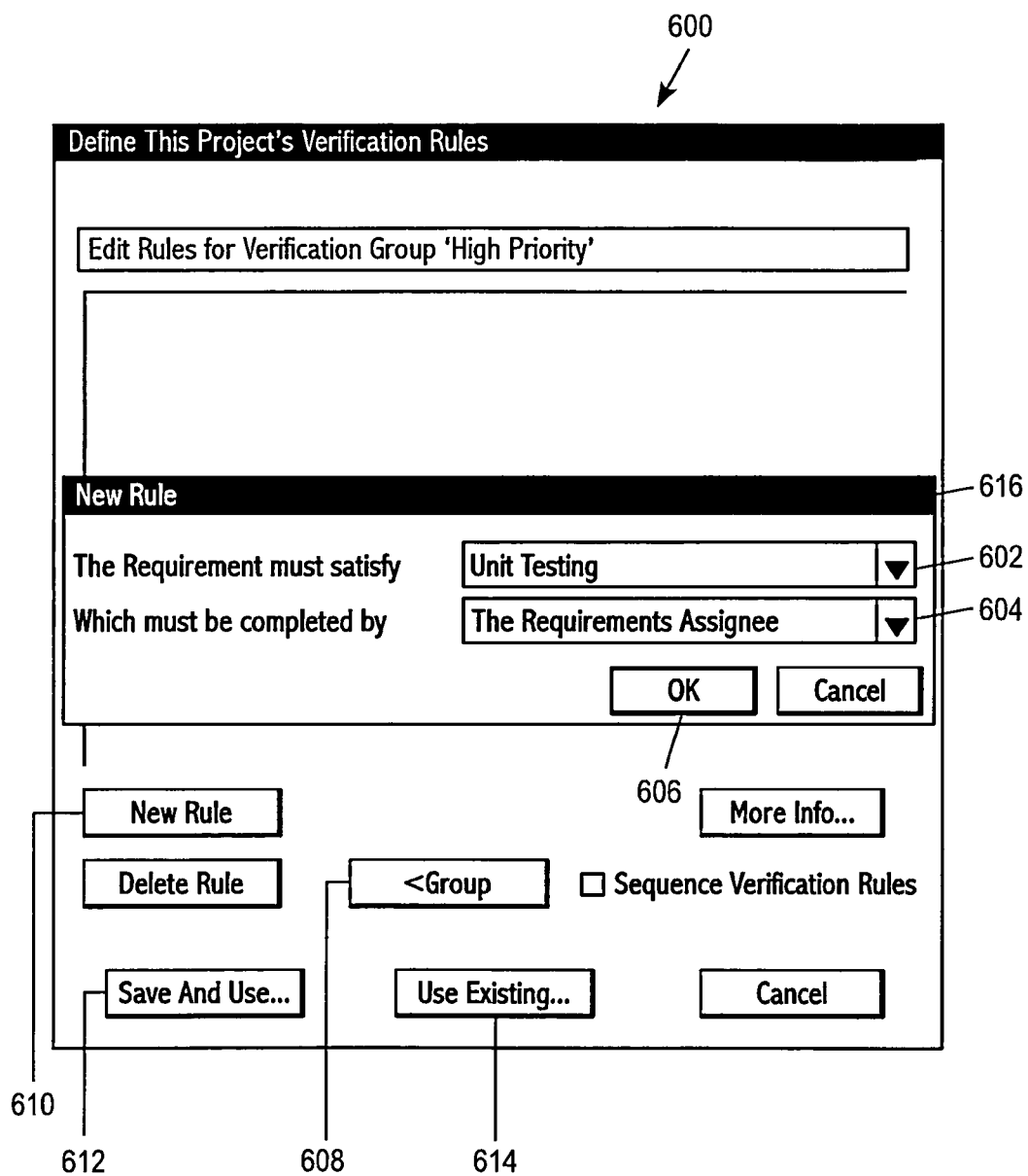
FIG. 6 illustrates an example of editing rules for a given group.

Once a Verification Group is created, a user can highlight the group and click on the "Rules>" button 508 to edit verification rule(s) for a given group. FIG. 6 illustrates an example of editing rules for a given group in an "Edit Rules" dialog 600. Referring to FIG. 6, when the "New" button 610 is clicked, a "New Rule" dialog 616 appears. In the "New Rule" dialog, the rules specify that the requirement must satisfy "Unit Testing" and must be completed by "The Requirement's Assignee" in text fields 602 and 604. The verification rules available for selection can include: Code Review, Quality Review, System Test, Unit Testing, Sub-System Test and Integration Test. It can also be decided whether the user assigned to the requirement is allowed to execute the test, or if another user must execute the test. When the "OK" button 606 is clicked, the new rules are created under the "High Priority" group. The "<Group" 608 button can be used to return to the "Verification Groups" dialog 500. The "Save and Use" button 612 can be used to save the rules for future use. The "Use Existing" button 614 can be used to select saved rules for a given group.

Referring back to FIG. 5, the "Rename Group" button 504 can be used to rename the group, once created. The "Delete Group" button 506 can be used to delete a group. The "Save and Use" button 510 can be used to save the group information setting for future use. The "Use Existing." button 512 can be used to select saved group information setting for a given group.

Figure 11:
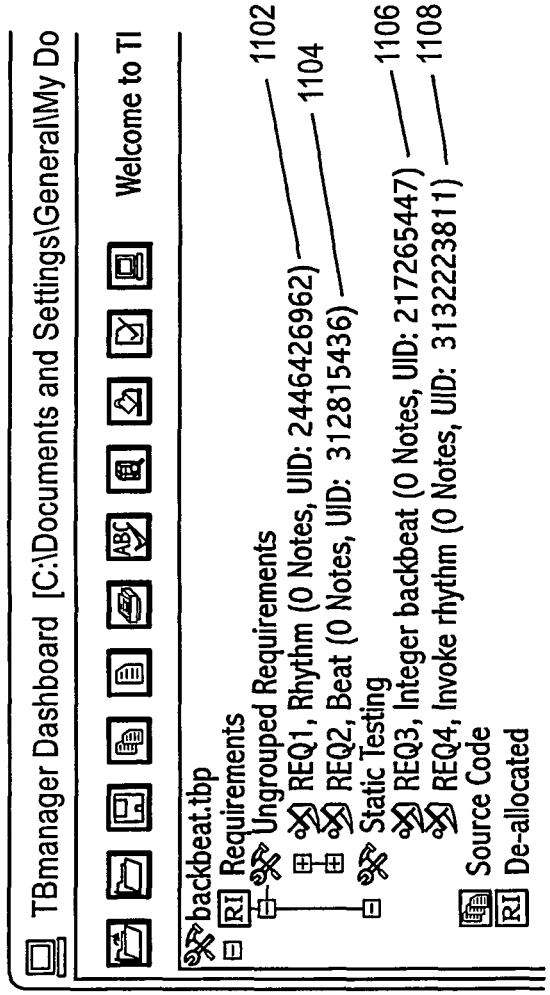
FIG. 11 illustrates an example of ungrouped requirements and grouped requirements.

With a group being defined as described above, requirements can be associated with the group. FIG. 11 illustrates an example of ungrouped requirements and grouped requirements. In FIG. 11, REQ 1 1102 and REQ 2 1104 are ungrouped requirements. REQ 3 1106 and REQ 4 1108 are included under the group named "Static Testing."

Sibling Requirement View

Figure 12:
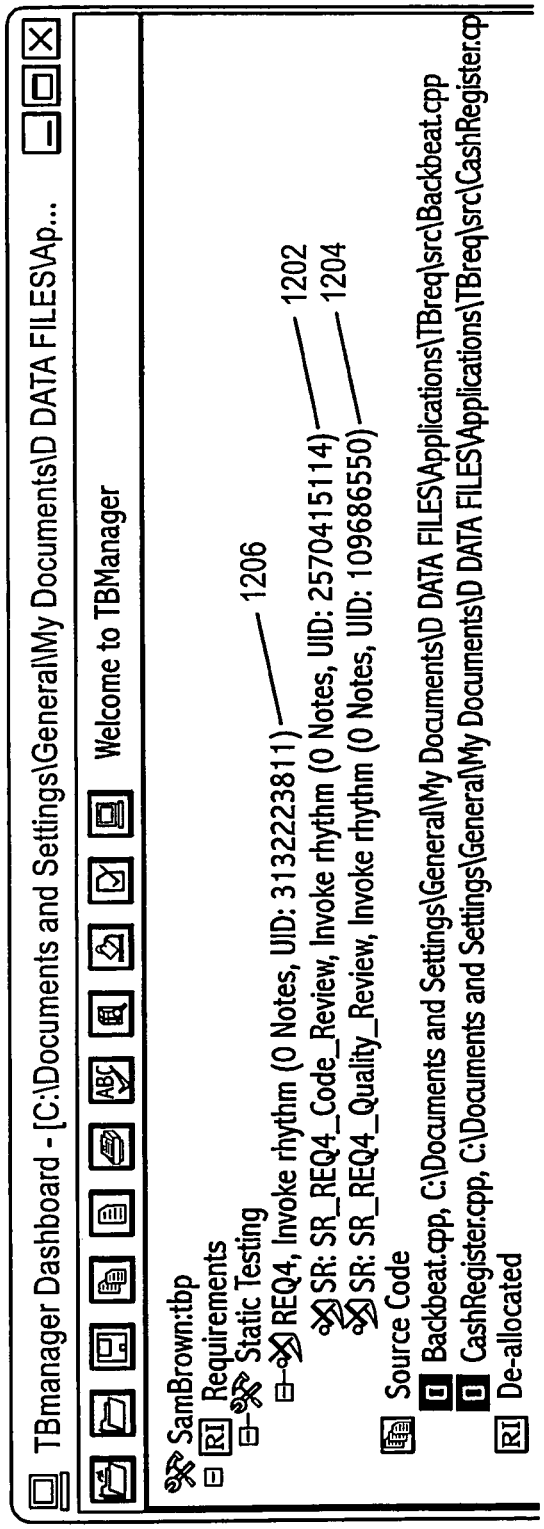
FIG. 12 illustrates an example of a sibling requirement.

FIG. 12 illustrates an example of a sibling requirement view. In FIG. 12, two sibling requirements 1202 and 1204 correspond with the requirement 1206. Sibling requirement 1202 is for code review, sibling requirement 1204 is for quality review.

Verification can be driving by the set of sibling requirements, and each requires an individual test run to be executed. A requirement is verified only when all sibling requirement corresponding to the requirement have been verified.

Figure 13:
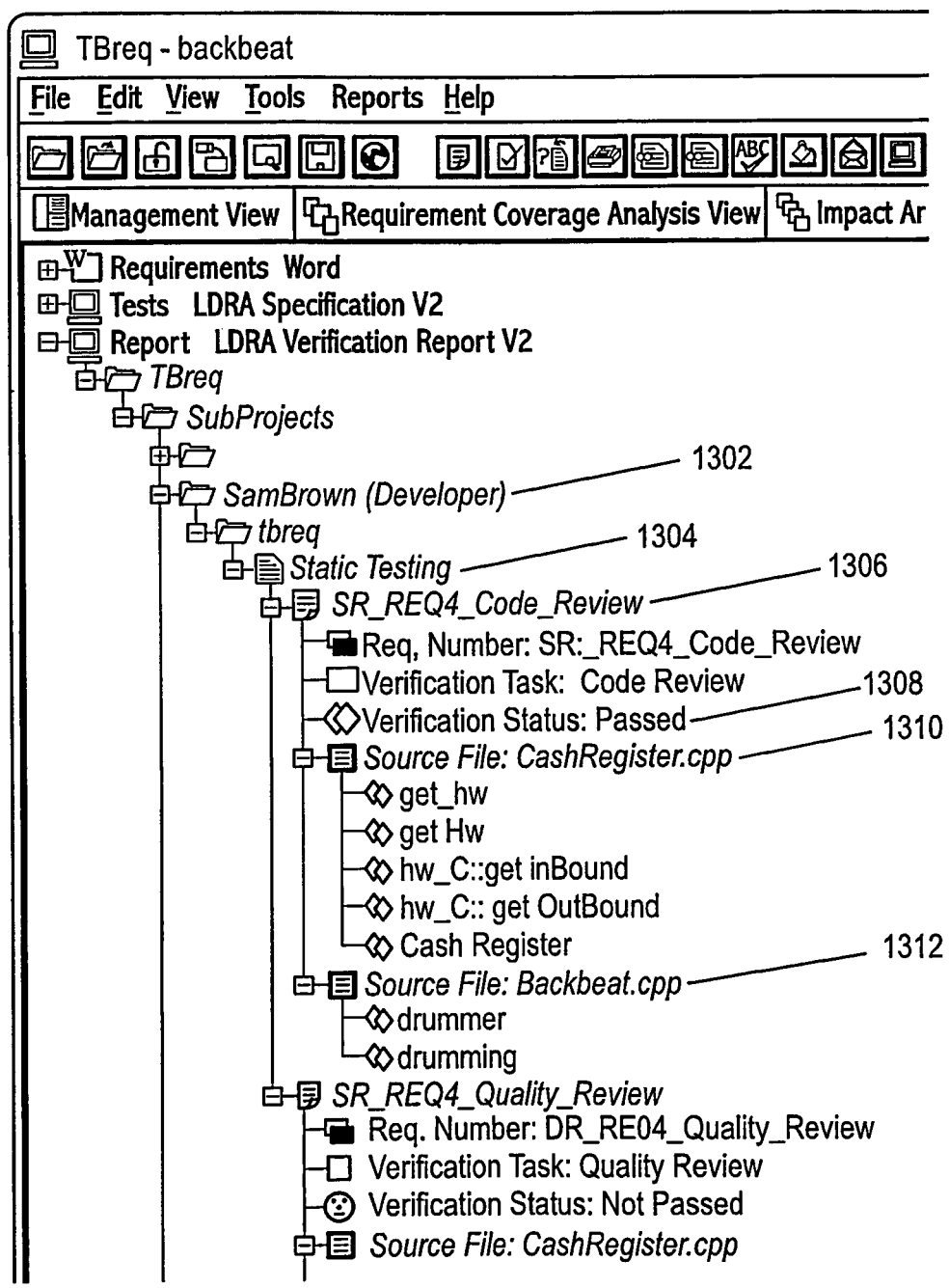
FIG. 13 illustrates another example of a sibling requirement.

FIG. 13 illustrates another example of a sibling requirement view. In FIG. 13, sibling requirement 1306 is under the group named "Static Testing" 1304 associated with a developer, named "Sam Brown" 1302. The sibling requirement 1306 indicates that the verification task is code review. In this example, the verification status 1308 of the sibling requirement 1306 is "Passed." It is also indicated that source files named CashRegister.cpp and Backbeat.cpp 1310 and 1312 are associated with the sibling requirement 1306.

Project View

Figure 4C:
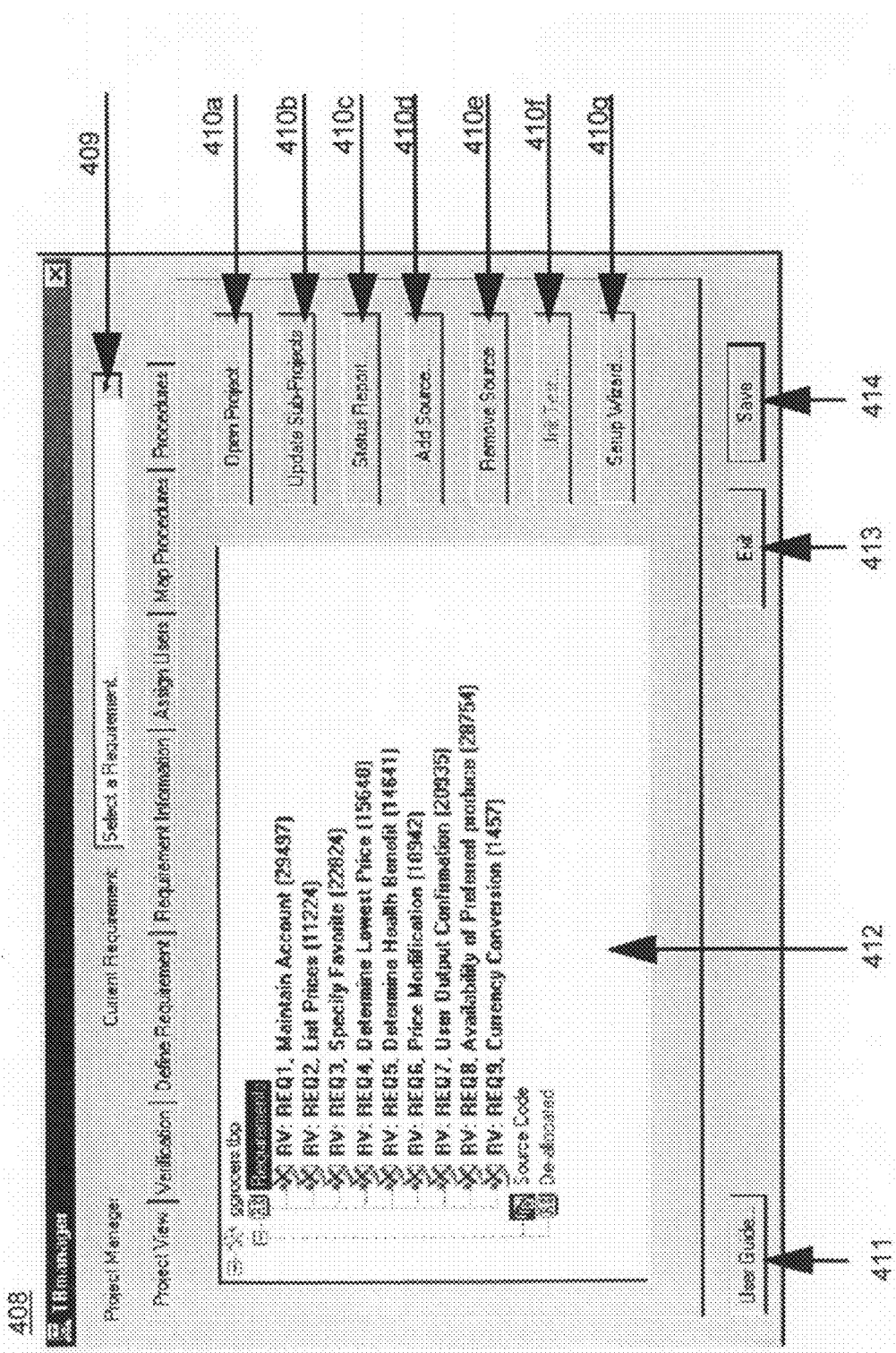

As shown in FIG. 4C, the GUI can have a tabbed format to provide users with different views (e.g., Project, Verification, Define Requirement, Requirement Information, Assign Users, Map Procedures, and Procedures) that can be selected and actions that can be performed based on their assigned roles. FIG. 4C illustrates a GUI 408 that can be displayed when the Project View tab is selected. The project GUI 408 can display all the requirements assigned to and by the user (e.g., requirements in bold type can represent those assigned to the user and requirements not in bold type can represent those that the user has assigned).

The project GUI 408 includes a Current Requirement drop-down menu 409, which can be used to select and display a particular requirement for the project. The GUI 408 also includes buttons, such as an Open Project button 410a, which can be used to select a project or subproject file for loading, an Update Sub-Projects button 410b, which can be selected to update/synchronize all currently checked-in sub-projects with recent modifications to the requirements for the project, a Status Report button 410c, which can be selected to display a status report based on the current requirements for the project, an Add Source button 410d, which can be selected to add/upload a source file of code to the current project, a Remove Source button 410e, which can be selected to remove a currently selected source code file from the current project, a Unit Test button 410f, which can be selected to launch an external tool for unit testing (e.g., LDRA Testbed™ and TBrun™), and a Setup Wizard button 410f, which can be selected to setup roles and users, if the current user has the necessary permission, as described herein. Additional elements of the project GUI 408 include a User Guide button 411, which can be selected to display a user guide, as well as Exit and Save buttons 413 and 414, which can be selected to exit the tool and save the current project, respectively.

The project GUI 408 can also display a Project Tree 412 to show the requirements that are assigned to the user and any source code files added to the project. The Project Tree 412 can display each requirement by number, name, reference identifier and type, where different icons can be used to represent different types of requirements. Additionally, an "X" symbol can be used over a requirements icon to indicate that the corresponding requirement is unverified. To view more information about a particular requirement, the user can select the Requirement Information tab, as described herein.

Updating sub-projects can be performed to distribute modifications to requirements of the project to affected sub-projects. To update sub-projects, users should first check-in their sub-projects. Then, after modifying the requirement (e.g., re-assigning the requirement, un-verifying the requirement, etc.), the Update Sub-Projects button 410b can be selected to disseminate the modification to all of the affected checked-in sub-projects so that when the users subsequently check-out their sub-projects, they can access the modification. While only users working on sub-projects affected by the requirements modification need check-in their sub-projects before updating sub-projects, all users should check-in their sub-projects to make a modification to users (e.g., when adding or removing users to/from the project).

In one embodiment, a user can generate a status report to display the current status of all requirements associated with the user by selecting the Status Report button 410c. The status report can provide a summary of the requirements assigned to or by the user and can display detailed requirement attributes such as, requirement name, requirement number, requirement document, requirement body, user assigned to the requirement, and the role of the assigned user. As the project progresses and procedures are mapped to the requirements, as described herein, the status report can be updated to include a table of mapped procedures for each requirement. The table can display detailed attributes of the mapped procedures, such as the procedure name, the name and location of the source code file, the path coverage achieved, the branch decision coverage achieved, the MC/DC coverage achieved, and the statement coverage achieved. The achieved coverage fields in the table can remain empty until unit testing of the mapped procedure has been performed, as described herein. After unit testing is performed, these fields can be updated to show the coverage achieved. Additionally, after unit testing is performed, the status report can indicate a percentage of the tested mapped procedures achieving the desired coverage. The status report can also be configured to distinguish how verified and unverified requirements are displayed, for example, by using different color text.

After requirements have been defined and users have been assigned to the defined requirements, as described herein, source code that has been developed by the users can be added to the project by selecting the Add Source button 410d. Once added, the source code can be displayed in the Project Tree 412. Note that source code files can be added to the project but not to the requirements themselves because procedures in the source code files, not the source code files themselves, can be mapped to the requirements, as described herein. Source code files can also be removed from the project by selecting the source code file to be removed in the Project Tree 412 and pressing the Remove Source button 410e.

Requirement Information View

Figure 4D:
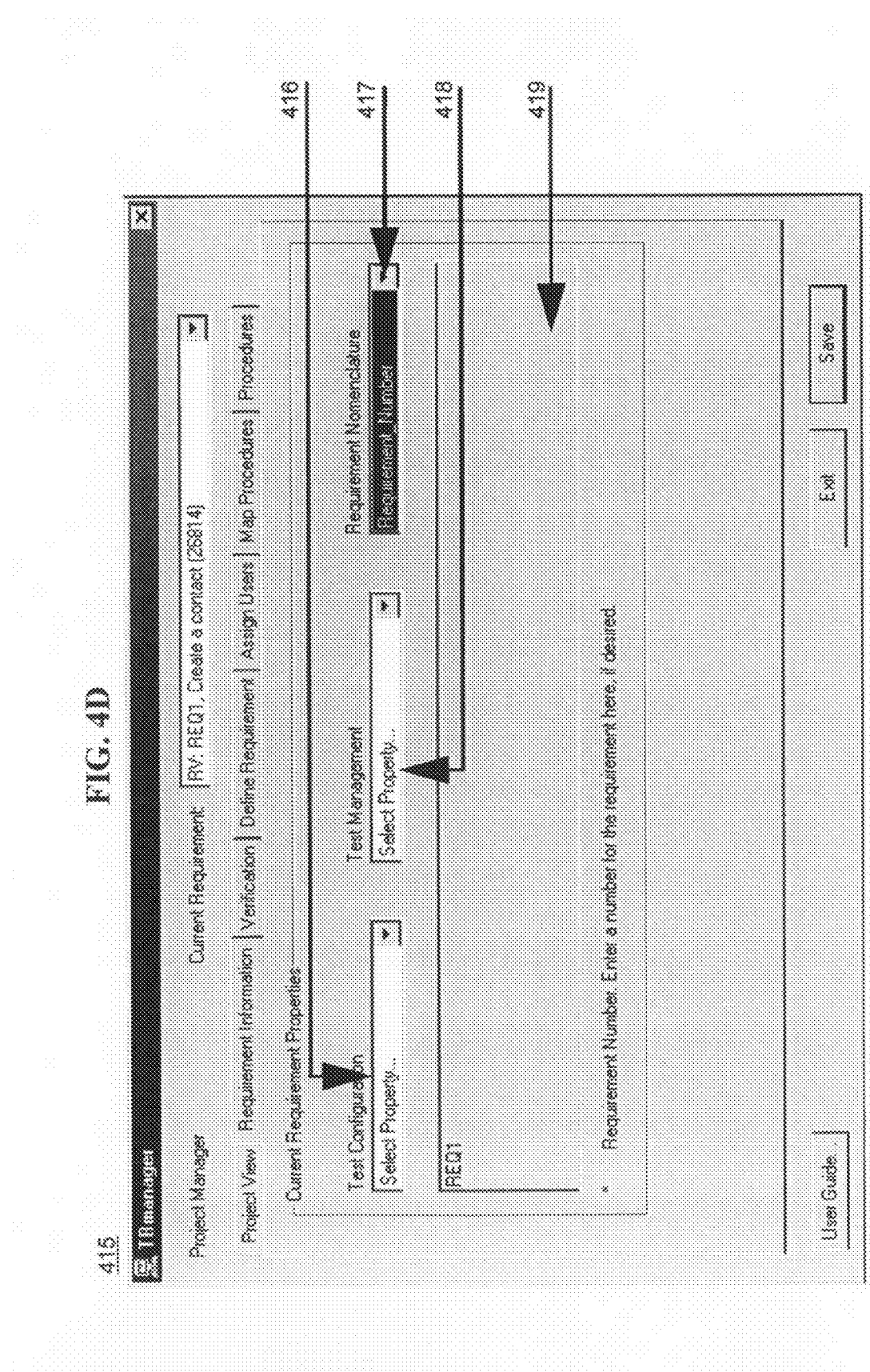

FIG. 4D illustrates a GUI 415 that can be displayed when the Requirement Information tab is selected. The requirement information GUI 415 can display information about the current selected requirement. In particular, the requirement information GUI 415 can group the information about the currently selected requirement into three areas of interest: test configuration, test management and requirement nomenclature. A Test Configuration drop-down menu 416 can be used to view and edit information about the test configuration properties of the currently selected requirement, a Test Management drop-down menu 418 can be used to view and edit information about the test management properties of the currently selected requirement, and a Requirement Nomenclature drop-down menu 417 can be used to view and edit information about the requirement nomenclature of the currently selected requirement. The requirement information GUI 415 includes a View/Edit area 419, in which the selected requirement can be displayed and/or edited. The View/Edit area 419 can be grayed out to indicate when the user is not permitted to edit the value or description associated with the selected requirement information.

Define Requirement View

Figure 4E:
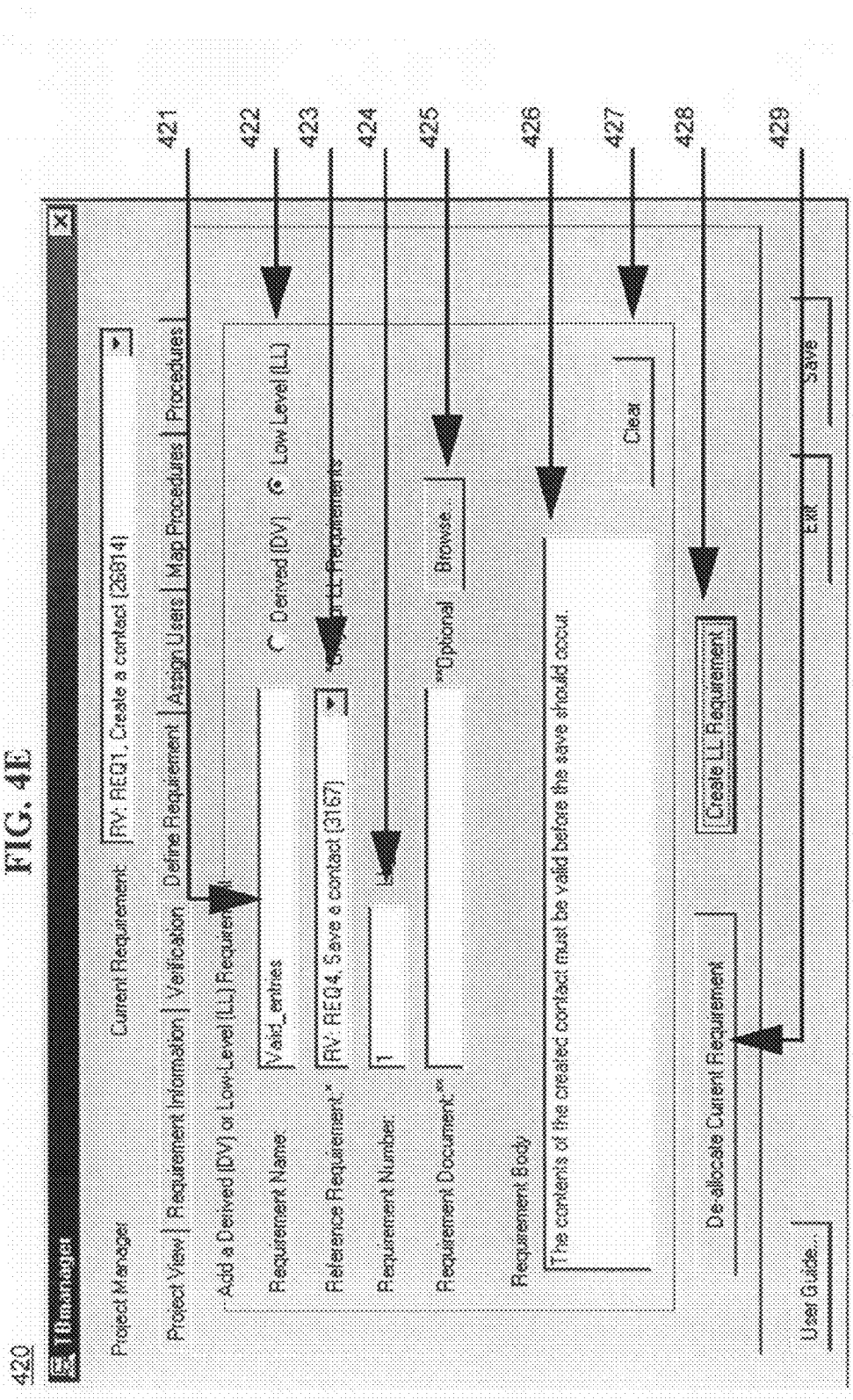

During the life span of a project, there can be a need to introduce new requirements or refine existing requirements. To define a requirement, the Define Requirement tab can be selected. FIG. 4E illustrates a GUI 420 that can be displayed when the Define Requirement tab is selected. Using the define requirement GUI 420, the user can create and add low-level or derived requirements to the project, depending on the permissions assigned to the user's corresponding role. As described herein, high-level requirements include requirements captured by the requirement capture tool and imported into the project. Low-level requirements include requirements that are associated with a high-level requirement. Derived requirements include requirements not captured by the requirements capture tool but defined in TBmanager™ and are inferred or derived from high-level or low-level requirements.

As shown in FIG. 4E, the define requirement GUI 420 includes a Requirement Name field 421 that can be used to enter the name of the requirement being defined, Requirement Type radio buttons 422 that can be used to select whether the requirement being defined is a derived (DV) or low-level (LL) requirement, and a Reference Requirement drop-down menu 423 that can be used when defining low-level requirements to select the high-level requirement with which the low-level requirement is associated (otherwise "None (DV Requirement)" can be selected). The define requirement GUI 420 also includes a Requirement Number field 424 that can be used to enter the number of the requirement being defined. In one embodiment, each requirement for the project requires a unique identification number, which can be automatically filled in by TBmanager™. The define requirement GUI 420 further includes a Requirement Document Path field 425 that can be used to enter the path to a document detailing the requirement being defined (the Browse button can be used to locate the document), a Requirement Body field 426 that can be used to enter a brief description of the requirement being defined, a Clear button 427 that can be used to clear all fields in the define requirement GUI 420, and a Create LL/DV Requirement button 428 that can be pressed to create the new requirement. In one embodiment, TBmanager™ can automatically use values specified in a template when importing requirements into the project as values for the desired code coverage for the new requirement. Newly defined low-level or derived requirements can be displayed in the Project Tree 412.

During the life span of a project, it might be necessary to dismiss or ignore a requirement so that it will no longer be considered for verification purposes. A user can select a requirement to be de-allocated in the Project Tree 412 via the project GUI 408 and can de-allocate the selected requirement using a De-allocate/Re-allocate Current Requirement button 429 via the define requirement GUI 420. The De-allocate/Re-allocate Current Requirement button 429 can be configured as a context-sensitive button with respect to the selected requirement so that it toggles between "De-Allocate Current Requirement" and "Re-allocate Current Requirement" as appropriate. Thus, a user can re-allocate a de-allocated requirement in a similar manner by selecting the de-allocated requirement in the Project Tree 412 via the project GUI 408 and can re-allocate the selected requirement using the De-allocate/Re-allocate Current Requirement button 429 via the define requirement GUI 420.

Assign Users View

Figure 4F:
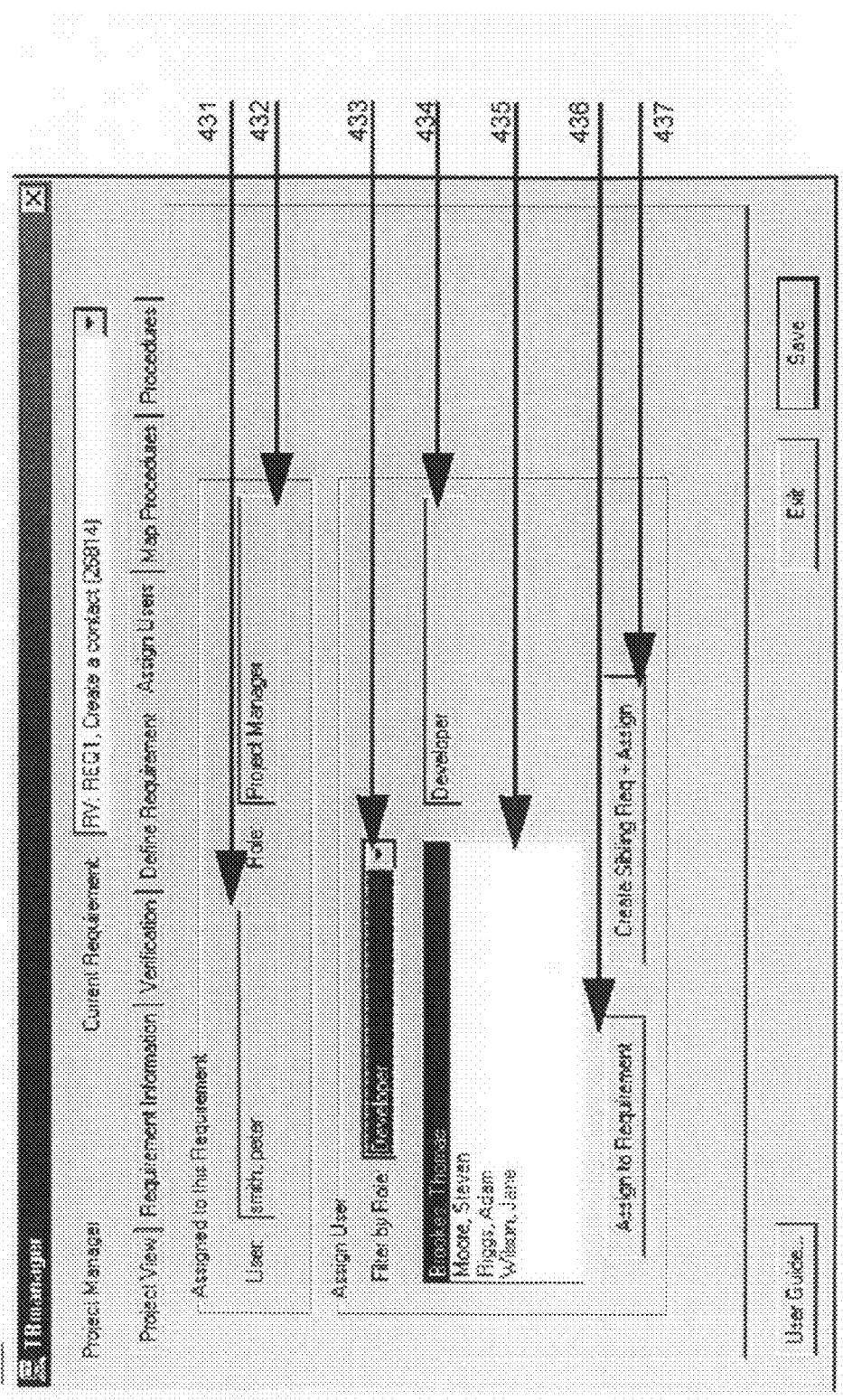
Figure 4G:
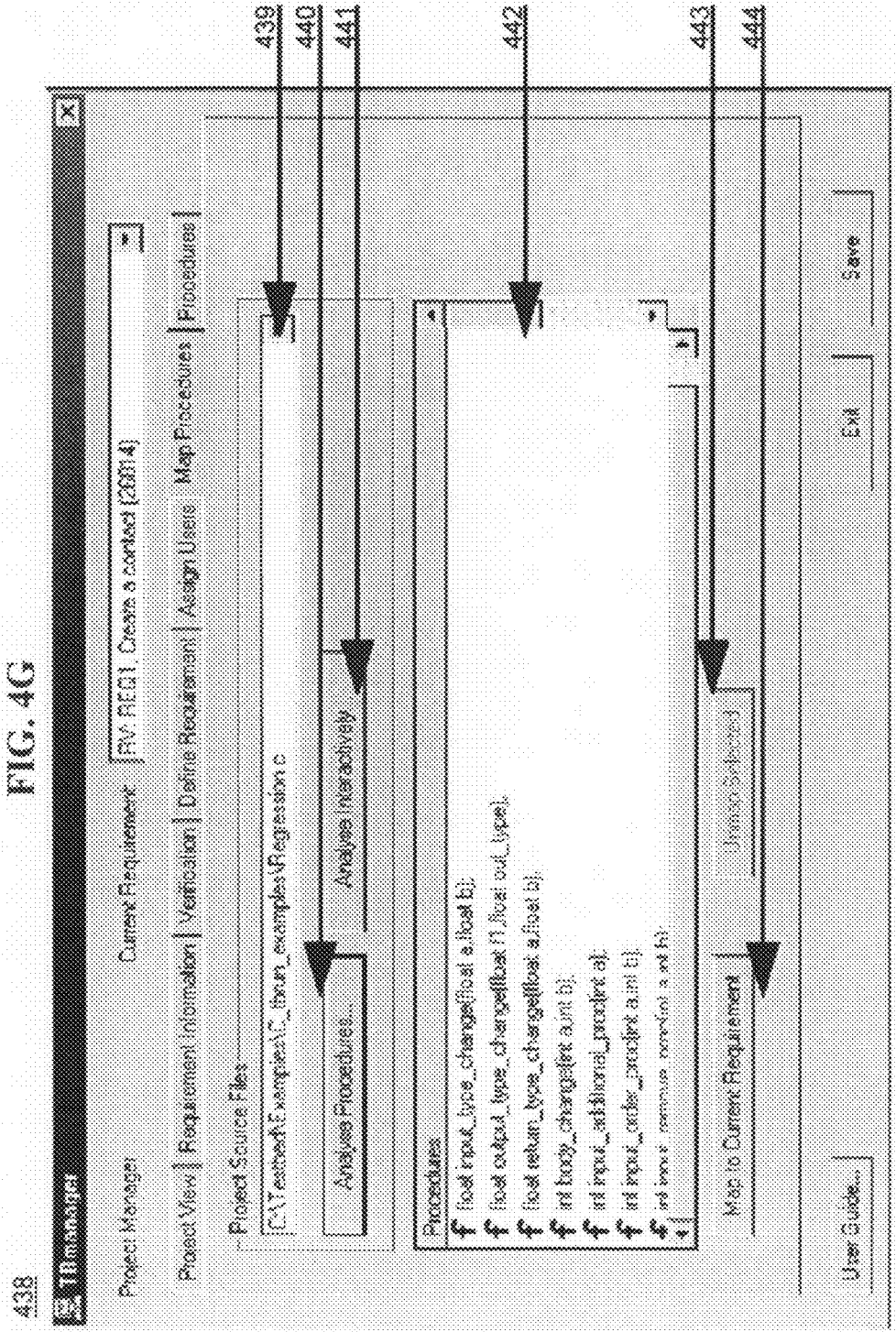

Having setup the roles and users of the project, users can be assigned requirements to work on by selecting the Assign Users tab. FIG. 4F illustrates a GUI 430 that can be displayed when the Assign Users tab is selected. Using the assign users GUI 430, a user having the necessary permission can assign users to requirements and create sibling requirements. As described herein, a sibling requirement can be created in TBmanager™ for the purposes of requirement diversification and task management and represents a copy of a high-level, low-level or derived requirement for the project. A requirement that is to be assigned can be selected from the Project Tree 412 via the project GUI 408 or from a Current Requirement drop-down menu via the assign users GUI 430.

The assign users GUI 430 includes an "Assigned to this Requirement" field having a User field 431 that can display a name of a user assigned to the current requirement and a Role field 432 that can display the role assigned to the user. The assign users GUI 430 also includes an "Assign User" field having a Filter by Role drop-down menu 433 that can be used to identify the users 435 for the project who are available for selection based on their corresponding role 434. An Assign to Requirement button 436 can be selected to assign a selected user from the identified users 435 to the current requirement.

To finish the assignment and create a sub-project for the user, the Save button 414 can be selected via the project GUI 408, followed by the Update Sub-Projects button 410*b*. In one embodiment, a directory named "Sub-Projects" can be established in the project directory to contain all of the users' sub-projects. Each user can have a separate sub-projects directory that can be automatically created when first assigned a requirement. Users can then open their respective sub-projects to work on assigned requirements. The users can copy their sub-project directories to different machines (e.g., their own workstations or laptops with TBmanager™ installed) to work on assigned requirements. Users can then launch TBmanager™ on their machines, select the Open Project button 410*a* via the project GUI 408, navigate to their sub-project directory, and select the appropriate sub-project to work on. Users can be asked to login by entering their name. The project GUI 408 can then refresh itself to display the user's project and the assigned requirements.

The assign users GUI 430 can also be used to create a sibling requirement, which is a copy of an existing high-level, low-level or derived requirement. The sibling requirement can be identical to the corresponding high-level, low-level or derived base requirement except for a unique identifier assigned to the sibling requirement. A sibling requirement can duplicate a base requirement thread at the time the sibling requirement is created. In this way, sibling requirements can enable a user to assign the same requirement to multiple users having different roles (a sibling cannot be assigned to two users of the same role).

To create a sibling requirement, one of the users 435 displayed via the assign users GUI 430 can be selected and assigned to the sibling requirement by selecting a Create Sibling Req+Assign button 437. In one embodiment, the user assigned to the sibling requirement should have a different role than the user assigned to the base requirement. A newly created sibling requirement can be viewed via the project GUI 408 and displayed in the Project Tree 412 as a child of the base requirement. Only users with permission to Make Sub-Projects should be enabled to create sibling requirements.

Because sibling requirements can be considered exact copies of a corresponding base requirement, if the base requirement changes, then all of its associated sibling requirements should be de-allocated, as described herein. Then, new sibling requirements of the modified base requirement can be created and assigned to the appropriate users. If the base requirement has a new procedure assigned to it, has its requirement body changed, or any other change happens that might affect the conditions under which the base requirement can be verified, new sibling requirements should to be created.

Map Procedures View

FIG. 4G illustrates a GUI 438 that can be displayed when the Map Procedures tab is selected. Having added source code files developed by the users to the project, as described herein, the map procedures GUI 438 can be used to select an added source code file, analyze the selected source code file for available procedures, and map selected procedures to a current selected requirement. The Project Source Files drop-down menu 439 can be used to select a source code file that has been added to the current project and return a list of procedures 442 found in the selected source code file. For example, the LDRA Testbed™ tool can be invoked to analyze the selected source code file and return the identified list of procedures 442 to TBmanager™.

The selected source code file can also be analyzed statically and/or interactively for conformance with project coding rules and quality metrics by selecting the Analyze Procedures button 440 and Analyze Interactively button 441, respectively. The LDRA Testbed™ tool can also be invoked to perform the static and/or interactive analysis of the selected source code file. If interactive analysis is desired, the user can perform code review, quality review, and design review analysis. Upon completion of the analysis, the map procedures GUI 438 can display the identified procedures 442 found in the selected source code file. Using the Map to Current Requirement button 444, the user can map particular identified procedures 442 to the current requirement, which can be selected using the Current Requirement drop-down menu or the Project Tree 412 via the project GUI 408. Similarly, the Unmap Selected button 443 can be selected to unmap particular identified procedures 442 from the current requirement. Having mapped procedures to requirements, the user can select the Procedures tab to view a list of the procedures mapped to the current requirement.

Procedures View

The user can select a mapped procedure of a current requirement and view its corresponding input and output (I/O) variables via a procedures GUI 445, shown in FIG. 4H. The procedures GUI 445 includes a Select Procedure drop-down menu 446, which can be used to select a procedure from those procedures that are mapped to the current requirement. The current requirement can be selected from the Current Requirement drop-down menu or from the Project Tree 412 via the project GUI 408. As a result of selecting a mapped procedure, the procedures GUI 445 can be updated to display the I/O variables of the selected mapped procedure in the I/O Variables field 447. Additionally, the procedures GUI 445 includes a Desired Coverage field 449, which can be used to modify the desired code coverage values (e.g., Statement, Branch, MC/DC, and Path coverage values) for the current requirement, and a Coverage Achieved at Verification field 450, which can be used to view the achieved coverage after unit testing. The Unmap This Procedure button 448 can be selected to unmap the selected mapped procedure from the current requirement.

Once procedures have been mapped to requirements, unit testing can be initiated. First, a requirement having mapped procedures to be tested can be selected either from the Project Tree 412 or the Current Requirement drop-down menu 409 via the project GUI 408. Next, to initiate the unit test, the source code file containing the procedures that are mapped to the selected requirement can be selected, followed by the Unit Test button 410f. An external unit test tool can then be invoked to perform the unit test. For example, LDRA TBrun™ is a unit test tool that can be invoked via the LDRA Testbed™ tool. Using the external test tool, test cases for the mapped procedures can be created. A mapped procedure to be tested can then be selected, inputs and expected outputs for the test case can be entered, and the test case can be run.

If results of the test case(s) are satisfactory and desired code coverage is achieved, completion of requirement verification should be confirmed. At least one test case for each mapped procedure for a requirement should be performed before confirming completion of requirement verification. After closing the external unit test tool, TBmanager™ can refresh the Project Tree 412 to display the requirement as verified (e.g., the corresponding requirements icon can be displayed without the "X" symbol). The project manager can now review the unit test information for the project to assess the users' work.

Verification View

Once a user has performed unit testing on the mapped procedure(s) for a requirement, the requirement can be displayed as "verified" in the Project Tree 412, shown in the project GUI 408. Because the unit testing of the mapped procedure(s) may not have achieved the desired coverage, however, the project manager, or other user(s) having the necessary permission, should review the results of the unit testing and decide whether the requirement should actually be considered verified.

Figure 4I:
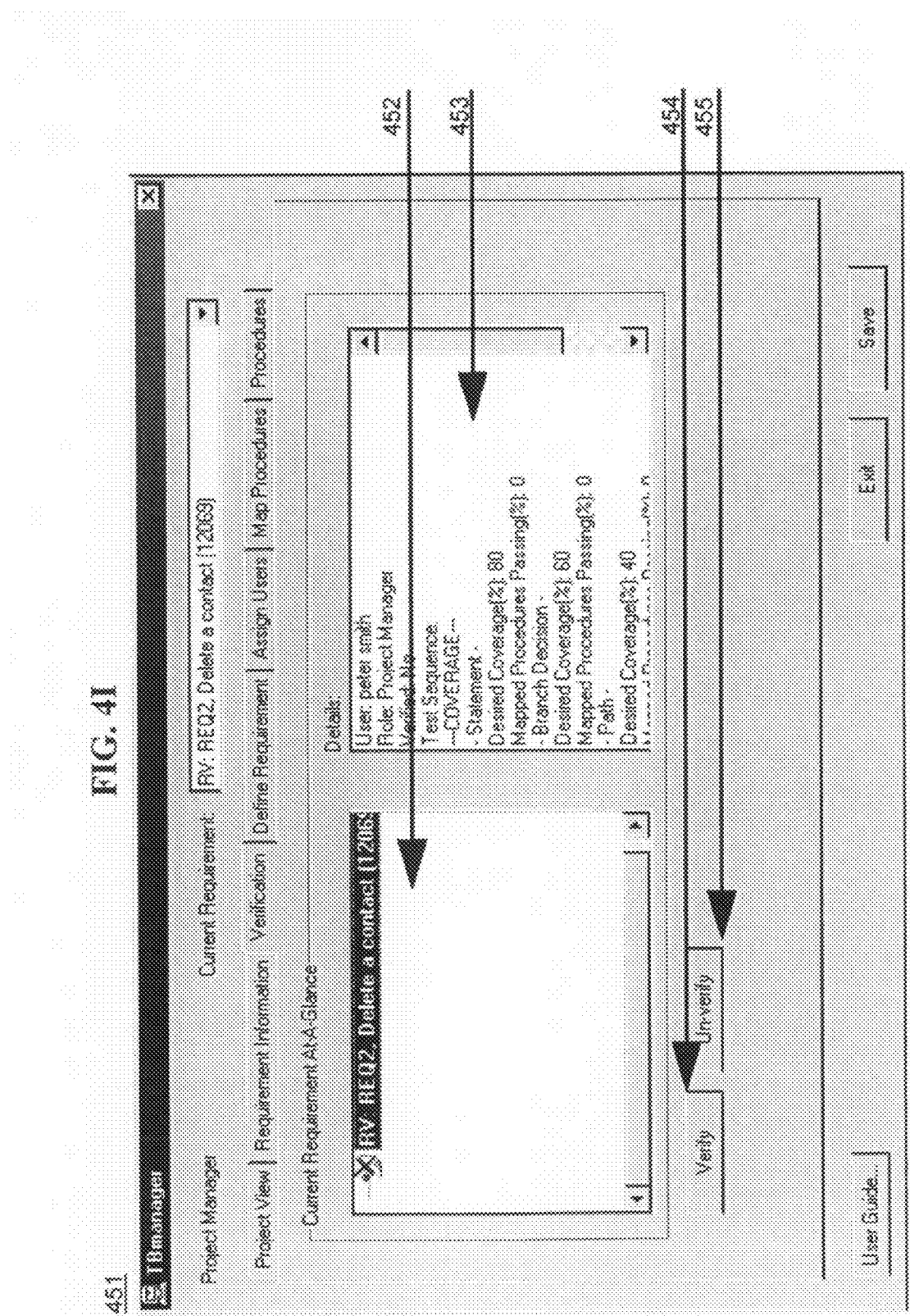

Depending on the permissions assigned to a user, the user can verify whether a requirement has met the desired code coverage by selecting the Verification tab to access a verification GUI 451, shown in FIG. 4I. To verify a requirement, the user can select the requirement to be verified from the Project Tree 412 via the project GUI 408 or from the Current Requirement drop-down menu via the verification GUI 451. The verification GUI 451 includes a Details field 453 displaying the current status of the selected requirement 452. The Details field 453 indicates the user assigned to the selected requirement 452 and their role, the expected code coverage, and the achieved code coverage, which can be displayed according to percentages of mapped procedures achieving the desired coverage. If the user is satisfied with the coverage achieved for the selected requirement the user can press the Verify button 454 to maintain the current status of the selected requirement as verified. However, if the user is unsatisfied with the coverage achieved for the selected requirement, the user press the Un-verify button 455 to change the current status of the selected requirement to unverified. Because un-verifying a requirement modifies that requirement, the user should update any sub-projects associated with the requirement.

With respect to verification of sibling requirements, a sibling requirement acts much like a low-level requirement. That is, in order for a base requirement to be considered verified, all of its sibling requirements must be verified first. For example, if a developer user has been assigned a low-level requirement having two sibling requirements, one for an IVV user and another for a QA user, the developer cannot indicate the low-level requirement is verified until the IVV and QA users indicate the corresponding sibling requirements are verified.

An exemplary usage scenario for TBmanager™ is as follows. First, the project manager can set-up a project based on captured high-level requirements, create low-level, derived and sibling requirements (if appropriate), and assign requirements to users. Users can check-out their respective sub-projects, established when the project manager assigns requirements to the users. That is, the users can make a copy of their sub-projects for the purpose of performing remote operations on the sub-projects. Users can modify the sub-project by mapping procedures and testing and analyzing source code, among other tasks. Users can then check-in their modified sub-projects. That is, the users can copy the updated contents of the sub-projects back into the project's directory tree. The project manager can subsequently log-in and obtain a complete and current view of all aspects of the project.

Defect View

Figure 4J:
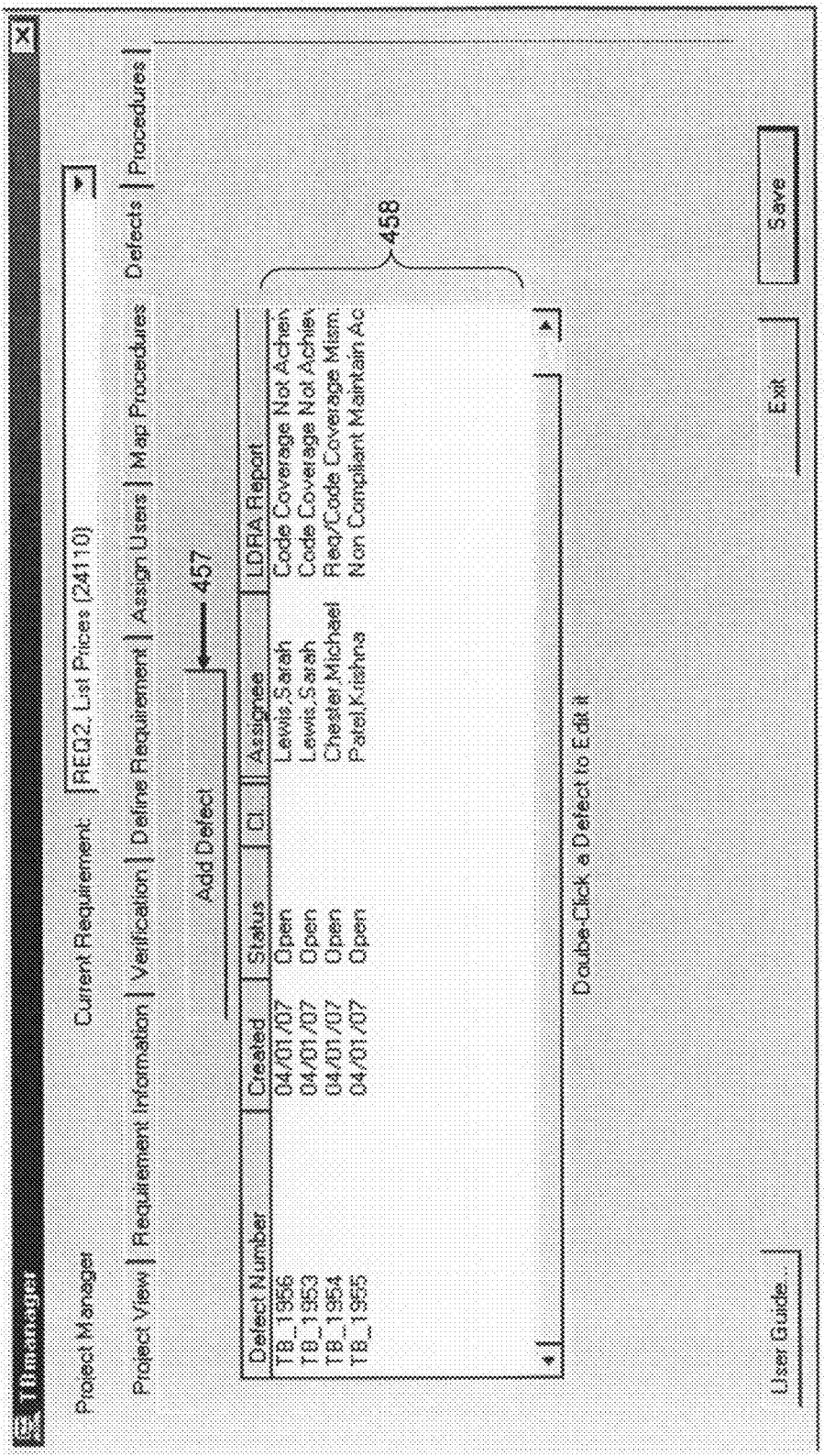

FIG. 4J illustrates a GUI 456 that can be displayed when the Defect tab is selected. In one embodiment, a user can track defects in source code for the project via the defects GUI 456. For example, the defects GUI 456 can be used to track defects (i.e., non-conformances) in source code based on the results of the analyses performed by the static analysis tool. As shown in FIG. 4J, the user can add a defect to be tracked by selecting the "Add Defect" button 457. Added defects 458 are displayed with information about the defect, including, for example, a defect number, date created, status, and user assigned to the defect, as well as information regarding disposition of the defect. Added defects 458 can be also be selected for editing.

CONCLUSION

The present invention has been described with reference to several exemplary embodiments, however, it will be readily apparent to persons of skill in the relevant art(s) that it is possible to embody the invention in specific forms other than those of the exemplary embodiments described above. This may be done without departing from the scope of the invention. These exemplary embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method for electronically managing dynamic requirements and software development for a software development project, the method, comprising:
    defining requirements for the project based on requirements information captured from a requirements source;
    for each requirement, dynamically associating source code or executable code developed to satisfy the requirement with the project or dynamically assigning development of source code and executable code to satisfy the requirement;
    receiving a selection of identified procedures in the source code or the executable code for mapping the selected, identified procedures in the source code or the executable code to the defined requirements for the project;
    creating an XML thread for each requirement, wherein each XML thread includes a plurality of elements that describe properties of the thread and a unique identifier for the respective requirement that enables traceability of the defined requirements for the software development project, and wherein the elements of each XML thread include a corresponding defined requirement, a mapping between at least one of the selected, identified procedures in the source code or executable code and the corresponding defined requirement, and results of analyses, code coverage measurements, system testing and unit testing performed on the mapped procedures;
    converting each XML thread into a hierarchal tree comprising a plurality of container objects;
    displaying, in a graphical user interface, a result of verifying whether or not the source code or executable code developed or being developed satisfies the defined requirement that is mapped to the source code or the executable code, wherein the verifying is based on results of one or more of analyses, code coverage measurements, system testing and unit testing performed on the mapped procedures; and
    storing the result of verifying in the XML thread;
    wherein the XML thread enables traceability between the respective requirement, the at least one of the selected, identified procedures in the source code or the executable code, and the result of verifying, and wherein the mapping includes invoking a static analysis tool to analyze the source code to identify the procedures associated with the defined requirements in the source code and storing the identified procedures in the XML thread that corresponds to the defined requirement.

2. The method of claim 1, wherein the defining the comprises:
    capturing high-level requirements for the project based on the requirements information; and
    defining at least one additional requirement for the project based on the requirements information.

3. The method of claim 2, wherein the defining at least one additional requirement for the project comprises:
    defining the at least one additional requirement for the project selected from the group consisting of: a low-level requirement that fulfills part of a captured high-level requirement for the project, a derived requirement that is inferred from a captured high-level or defined low-level requirement for the project, and a sibling requirement that is a copy of a high-level, low-level, or derived requirement for the project that defines and enables a verification task to be performed.

4. The method of claim 3, further comprising, prior to defining said at least one additional requirement, establishing and developing a software development project wherein the establishing and developing comprises:
    identifying users for the project; and
    assigning the defined requirements for the project to the users to establish corresponding sub-projects.

5. The method of claim 4, further comprising:
    generating a status report for a user summarizing the defined requirements assigned to the user; and
    updating the status report during the project to include any corresponding results of the analyses, code coverage measurements and the unit testing.

6. The method of claim 4, further comprising:
    creating a plurality of roles for the project based on groups of the users who are designated to perform similar actions;
    assigning permissions to the roles to define the actions that the users can perform; and
    selecting roles for the users from the plurality of created roles.

7. The method of claim 6, wherein the creating a plurality of roles comprises:
    creating a project manager role having permission to exercise control over the method for electronically managing requirements for software development.

8. The method of claim 7, wherein the creating a plurality of roles comprises:
    creating at least one additional role selected from the group consisting of: a developer role, a test engineer role, an independent verification and validation role, and a quality assurance role.

9. The method of claim 6, wherein the assigning permissions to the roles comprises:
    assigning at least one permission selected from the group consisting of: a create low-level requirements permission, a create derived requirements permission, a make sub-projects permission, an edit thread properties permission, and a manual verification permission.

10. The method of claim 1, wherein the mapping further comprises:
    invoking the static analysis tool to perform analyses on the source code, including applying project coding rules and quality metrics to the source code.

11. The method of claim 10, wherein the verifying comprises:
    determining that the defined requirements for the project are satisfied if results of the analyses indicate conformance of the source code to the project coding rules and the quality metrics.

12. The method of claim 11, further comprising:
tracking non-conformances based on the results of the analyses; and
reporting the non-conformances, including providing information regarding disposition of the non-conformances.

13. The method of claim 1, wherein the mapping further comprises:
invoking a unit test tool to run test cases on the mapped procedures.

14. The method of claim 13, wherein the verifying comprises:
determining that the defined requirements for the project are satisfied if the test cases generate desired results.

15. The method of claim 1, further comprising:
providing a status of the defined requirements for the project indicating whether each of the defined requirements is verified or unverified.

16. The method of claim 15, further comprising:
generating an integrated requirements traceability and verification matrix to dynamically track implementation of the defined requirements and the status of the defined requirements.

17. The method of claim 16, further comprising:
establishing sub-projects for the project by assigning the defined requirements for the project to users working on the project; and
synchronizing the sub-projects with the integrated requirements traceability and verification matrix.

18. The method of claim 17, further comprising:
enabling the users to access the project via a communications network; and
maintaining integrity of the requirements traceability and verification matrix by monitoring when the users checkout and check-in their corresponding sub-projects over the communications network.

19. A system comprising:
a processor; and
a memory storing instructions that when executed by the processor, causes the processor to invoke modules for electronically managing requirements for a software development project, the modules comprising:
a requirements module configured to define requirements for the project based on requirements information captured from a requirements source;
a projects module configured to dynamically, for each defined requirement:
associate source code and executable code developed to satisfy the requirement with the project; or
assign the development of source code and executable code to satisfy the requirement;
a mapping module configured to receive a selection of procedures identified in the source code to map the selected procedures identified in the source code to the defined requirements; and
a verification module configured to display, in a graphical user interface, a result of verifying whether the source code developed or being developed satisfies the defined requirement that is mapped to the source code, wherein the verifying is based on results of one or more of analyses, code coverage measurements and unit testing performed on the mapped procedures;
wherein one or more of the modules is configured to create an XML thread for each requirement, wherein the XML thread includes a plurality of elements that describe properties of the thread and a unique identifier for the respective requirement that enables traceability of the defined requirements for the software development project, and wherein the elements of each XML thread include a corresponding defined requirement, a mapping between at least one of the selected, identified procedures in the source code or executable code and the corresponding defined requirement, results of analyses, code coverage measurements, system testing and unit testing performed on the mapped procedures, and the result of verifying;
wherein one or more of the modules is configured to convert each XML thread into a hierarchal tree comprising of a plurality of container objects;
wherein the XML thread enables traceability between the respective requirement, the at least one of the selected, identified procedures in the source code or the executable code, and the result of verifying, and
wherein the mapping module is further configured to invoke a static analysis tool to analyze the source code to identify the procedures associated with the defined requirements in the source code and store the identified procedures in the XML thread that corresponds to the defined requirement.

20. The system of claim 19, wherein the requirements module is configured to capture high-level requirements for the project and define at least one additional requirement for the project based on the requirements information.

21. The system of claim 20, wherein the requirements module is configured to define the at least one additional requirement for the project selected from the group consisting of: a low-level requirement that fulfills part of a captured high-level requirement for the project, a derived requirement that is inferred from a captured high-level or a defined low-level requirement for the project, and a sibling requirement that is a copy of a high-level, low-level, or derived requirement for the project.

22. The system of claim 19, wherein the projects module is further configured to identify users for the project and assign the defined requirements for the project to the users to establish corresponding sub-projects.

23. The system of claim 22, wherein the projects module is further configured to create a plurality of roles for the project based on groups of the users who are designated to perform similar actions, assign permissions to the roles to define the actions that users assigned to the role can perform, and assign the roles to the users.

24. The system of claim 23, wherein the roles include a project manager role having permission to exercise control over the system for electronically managing requirements for software development and at least one additional role selected from the group consisting of: a developer role, a test engineer role, an independent verification and validation role, and a quality assurance role.

25. The system of claim 24, wherein the roles include a role defined by one of the users having permission to create roles.

26. The system of claim 23, wherein the permissions are selected from the group consisting of: a create low-level requirements permission, a create derived requirements permission, a make sub-projects permission, an edit thread properties permission, and a manual verification permission.

27. The system of claim 19, wherein the mapping module is further configured to invoke a static analysis tool to instrument and measure code coverage of the source code in tests.

28. The system of claim 27, wherein the verification module is configured to determine that the defined requirements for the project are satisfied if the code coverage measurements generate desired results.

29. The system of claim 19, wherein the mapping module is further configured to invoke the static analysis tool to analyze the source code by applying project coding rules and quality metrics to the source code.

30. The system of claim 29, wherein the verification module is configured to determine that the defined requirements for the project are satisfied if results of the analyses indicate conformance of the source code to the project coding rules and the quality metrics.

31. The system of claim 30, wherein the verification module is further configured to:
    track non-conformances based on the results of the analyses;
    report any non-conformances; and
    provide information regarding disposition of any non-conformances.

32. The system of claim 19, wherein the mapping module is further configured to invoke a unit test tool to run test cases on the mapped procedures.

33. The system of claim 32, wherein the verification module is configured to determine that the defined requirements for the project are satisfied if the test cases generate desired results.

34. The system of claim 19, wherein the projects module is configured to track a status of the defined requirements for the project indicating whether each of the defined requirements is verified or unverified.

35. The system of claim 34, wherein the projects module is further configured to generate an integrated requirements traceability and verification matrix to dynamically track implementation of the defined requirements and the status of the defined requirements.

36. The system of claim 35, wherein the projects module is configured to establish sub-projects for the project by assigning the defined requirements for the project to users working on the project, and to synchronize the sub-projects with the integrated requirements traceability and verification matrix.

37. The system of claim 35, wherein the projects module is further configured to generate status reports based on the traceability and verification matrix.

38. The system of claim 35, further comprising:
    a network interface module configured to enable the users to access the project via a communications network, wherein the projects module is configured to maintain integrity of the requirements traceability and verification matrix by monitoring when the users check-out and check-in their corresponding sub-projects via the network interface module.

39. A method for electronically managing requirements for software development for a software development project, the method, comprising:
    defining requirements for the project based on requirements information captured from a requirements source;
    for each requirement, dynamically associating one or more portions of source code or executable code developed to satisfy the requirement with the project or dynamically assigning development of source code and executable code to satisfy the requirement;
    receiving a selection of identified procedures in the source code or the executable code for mapping the selected, identified procedures in the source code or the executable code to the defined requirements for the project;
    creating an XML thread for each requirement, wherein each XML thread includes a plurality of elements that describe properties of the thread and a unique identifier for the respective requirement that enables traceability of the defined requirements for the software development project, and wherein the elements of each XML thread include a corresponding defined requirement, a mapping between at least one of the selected, identified procedures in the source code or executable code and the corresponding defined requirement, and results of analyses, code coverage measurements, system testing and unit testing performed on the mapped procedures;
    converting each XML thread into a hierarchal tree comprising a plurality of container objects;
    displaying, in a graphical user interface, a result of verifying whether or not the source code developed or being developed satisfies the defined requirement that is mapped to the source code, wherein the verifying is based on results of one or more of tests in accordance to one or more verification rules; and
    storing the result of verifying in the requirements data construct;
    wherein the requirements data construct enables traceability between the respective requirement, the at least one of the selected, identified procedures in the source code or the executable code, and the result of verifying, and
    wherein the mapping includes invoking a static analysis tool to analyze the source code to identify the procedures associated with the defined requirements in the source code and storing the identified procedures in the XML thread that corresponds to the defined requirement.

40. The method of claim 39, wherein a sibling requirement of a defined requirement is created by associating the sibling requirement with a verification rule.

41. The method of claim 39, wherein a sibling requirement of a defined requirement is created by associating the sibling requirement with a user.

42. The method of claim 39, further comprising:
    creating a group;
    associating one of more of the verification rules with the group; and associating one of more of the defined requirements with the group.

43. The method of claim 42, wherein for a requirement associated with the group, a sibling requirement is generated for each of the verification rules associated with the group.

44. The method of claim 39, wherein the verification rules include code review, quality review, system test, unit testing, sub-system test and integration test.

45. The method of claim 39, wherein verification rules specify whether a user assigned to a defined requirement is required to perform verification of the requirement or whether a user other than the one assigned to the defined requirement is required to perform verification.

46. The method of claim 39, wherein the defining requirements for the project includes parsing requirements information based on type and format of the requirements information.

47. The method of claim 46, wherein the type and format of the requirements information are specified by a user.

48. The method of claim 46, wherein the type and format of the requirements information are predefined.

49. A system comprising:
    a processor; and
    a memory storing instructions that when executed by the processor, causes the processor to perform operations for electronically managing requirements for a software development project, the operations comprising:
    defining requirements for the project based on requirements information captured from a requirements source;

receiving a selection of procedures identified in source code or executable code to map the selected procedures identified in the source code or the executable code to the defined requirements;

creating an XML thread for each requirement, wherein each XML thread includes a plurality of elements that describe properties of the thread and a unique identifier for the respective requirement that enables traceability of the defined requirements for the software development project, and wherein the elements of each XML thread include a corresponding defined requirement, a mapping between at least one of the selected, identified procedures in the source code or executable code and the corresponding defined requirement, and results of analyses, code coverage measurements, system testing and unit testing performed on the mapped procedures;

converting each XML thread into a hierarchal tree comprising a plurality of container objects;

displaying, in a graphical user interface, a result of verifying whether the one or more portions of the source code or the executable code developed or being developed satisfy the defined requirement that is mapped to the selected procedures identified in the source code or the executable code, wherein the verifying is based on results of one or more of tests in accordance to one or more verification rules; and storing the result of verifying in the requirements data construct;

wherein the requirements data construct enables traceability between the respective requirement, the at least one of the identified procedures in the source code or the executable code, and the result of verifying, and wherein the mapping includes invoking a static analysis tool to analyze the source code to identify the procedures associated with the defined requirements in the source code and storing the identified procedures in the XML thread that corresponds to the defined requirement.

50. The system of claim 49, wherein a sibling requirement of a defined requirement is created by associating the sibling requirement with a verification rule.

51. The system of claim 49, wherein a sibling requirement of a defined requirement is created by associating the sibling requirement with a user.

52. The system of claim 49, wherein verifying includes:
creating a group;
associating one or more of the verification rules with the group; and
associating one or more of the defined requirements with the group.

53. The system of claim 52, wherein for a requirement associated with the group, a sibling requirement is generated for each of the verification rules associated with the group.

54. The system of claim 49, wherein defining includes parsing requirements information based on type and format of the requirements information.

55. The system of claim 49, wherein the type and format of the requirements information are specified by a user.

56. The system of claim 49, wherein the type and format of the requirements information are predefined.

57. The method of claim 1, further comprising assigning one or more test cases to each requirement that circumscribes intended functionality.

58. The method of claim 39, wherein a sibling requirement of a defined requirement is created by associating the sibling requirement with an objective that assures conformance with a process objective or a qualitative assessment.

59. The method of claim 58, wherein the process objective or the qualitative assessment includes requirement validation, planning or documentation.

60. The method of claim 39, wherein a sibling requirement of a defined requirement is created by associating the sibling requirement with a defect item of the defined requirement.

61. The system of claim 49, wherein a sibling requirement of a defined requirement is created by associating the sibling requirement with an objective that assures conformance with a process objective or a qualitative assessment.

62. The system of claim 61, wherein the process objective or the qualitative assessment includes requirement validation, planning or documentation.

63. The system of claim 49, wherein a sibling requirement of a defined requirement is created by associating the sibling requirement with a defect item of the defined requirement.

64. The system of claim 49, wherein a sibling requirement of a defined requirement is created for a test case associated with the defined requirement.

65. The method of claim 39, wherein a sibling requirement of a defined requirement is created for a test case associated with the defined requirement.

66. The method of claim 1, wherein additional requirements include test cases associated with a defined requirement.

67. A system comprising:
a processor; and
a memory storing instructions that when executed by the processor, causes the processor to invoke modules for electronically managing requirements for a software development project, the modules comprising:
requirements module configured to define requirements for the project based on requirements information captured from a requirements source;
a modeling module configured to include architectural artifacts and implementation artifacts;
a graphical user interface configured to display links between the defined requirements and respective architectural artifacts and implementation artifacts of the modeling module;
a mapping module configured to associate one or more portions of source code with a defined requirement; and
a verification module configured to display, in the graphical user interface, a result of verifying whether the architectural artifacts and implementation artifacts satisfy the defined requirements that are respectively linked to the architectural artifacts and implementation artifacts based on results of one or more of tests in accordance to one or more verification rules;
wherein the system is configured to create an XML thread, wherein the XML thread includes a plurality of elements that describe properties of the thread and a unique identifier for the defined requirement that enables traceability of the defined requirements for the software development project, and wherein the elements of each XML thread include a corresponding defined requirement, a mapping between a portion of the source code and the defined requirement, results of analyses, code coverage measurements, system testing and unit testing performed on the mapped procedures, and the respective result of verifying;
wherein the system is configured to convert each XML thread into a hierarchal tree comprising of a plurality of container objects;
wherein the XML thread enables traceability between the defined requirement, the portion of source code, and the respective result of verifying, and wherein the mapping module is further configured to invoke a static analysis tool to analyze the source code to identify the procedures associated with the defined requirements in the source code and store the identified procedures in the XML thread that corresponds to the defined requirement.

68. The system of claim 67, wherein the architectural artifacts and implementation artifacts automatically generate source code for the linked defined requirement.

69. The system of claim 67, wherein the mapping module is further configured to associate one or more portions of manually produced source code with a defined requirement.

70. A method for electronically managing requirements for software development for a software development project, the method, comprising:
- defining requirements for the project based on requirements information captured from a requirements source;
- establishing a modeling module that includes architectural artifacts and implementation artifacts, wherein the defined requirements are linked to respective architectural artifacts and implementation artifacts in a graphical user interface;
- establishing a mapping module configured to associate one or more portions of source code with a defined requirement; and
- displaying, in the graphical user interface, a result of verifying whether the architectural artifacts and implementation artifacts satisfy the respective defined requirements that are linked to the architectural artifacts and implementation artifacts based on results of one or more of tests in accordance to one or more verification rules; and
- creating an XML thread for each requirement, wherein each XML thread includes a plurality of elements that describe properties of the thread and a unique identifier for the respective requirement that enables traceability of the defined requirements for the software development project, and wherein the elements of each XML thread include a corresponding defined requirement, a mapping between at least one of the selected, identified procedures in the source code or executable code and the corresponding defined requirement, results analyses, code coverage measurements, system testing and unit testing performed on the mapped procedures, and the respective result of verifying;
- converting each XML thread into a hierarchal tree comprising a plurality of container objects;
- wherein the requirements data construct enables traceability between the defined requirement, the portion of source code, and the respective result of verifying, and
- wherein the mapping module is further configured to invoke a static analysis tool to analyze the source code to identify the procedures associated with the defined requirements in the source code and store the identified procedures in the XML thread that corresponds to the defined requirement.

71. The method of claim 70, wherein the architectural artifacts and implementation artifacts automatically generate source code for the linked defined requirement.

72. The method of claim 70, wherein the mapping module is further configured to associate one or more portions of manually produced source code with a defined requirement.

73. The system of claim 67, wherein the one or more tests are carried out by a static analysis and code coverage tool, configured to provide code and data coverage for said implementation artifacts and architectural artifacts, wherein said implementation artifacts and architectural artifacts include at least one of code and data.

74. The method of claim 70, wherein the one or more tests are carried out by a static analysis and code coverage tool, configured to provide code and data coverage for said implementation artifacts and architectural artifacts, wherein said implementation artifacts and architectural artifacts include at least one of code and data.

* * * * *